US011942021B2

(12) United States Patent
Kato

(10) Patent No.: US 11,942,021 B2
(45) Date of Patent: Mar. 26, 2024

(54) DISPLAY DEVICE AND METHOD OF OPERATING A DISPLAY DEVICE

(71) Applicant: Samsung Display Co., Ltd., Yongin-si (KR)

(72) Inventor: Takeshi Kato, Hwaseong-si (KR)

(73) Assignee: SAMSUNG DISPLAY CO., LTD., Gyeonggi-do (KR)

( * ) Notice: Subject to any disclaimer, the term of this patent is extended or adjusted under 35 U.S.C. 154(b) by 0 days.

(21) Appl. No.: 17/900,085

(22) Filed: Aug. 31, 2022

(65) Prior Publication Data

US 2023/0133405 A1 May 4, 2023

(30) Foreign Application Priority Data

Oct. 28, 2021 (KR) ........................ 10-2021-0145735

(51) Int. Cl.
*G09G 3/20* (2006.01)

(52) U.S. Cl.
CPC ......... *G09G 3/2096* (2013.01); *G09G 3/2074* (2013.01); *G09G 2300/0452* (2013.01);
(Continued)

(58) Field of Classification Search
CPC ............... G09G 3/2096; G09G 3/2074; G09G 2300/0452; G09G 2320/0242;
(Continued)

(56) References Cited

U.S. PATENT DOCUMENTS

| | | | |
|---|---|---|---|
| 4,804,951 A | 2/1989 | Yamashita et al. | |
| 9,542,875 B2 | 1/2017 | Yang et al. | |

(Continued)

FOREIGN PATENT DOCUMENTS

| | | | |
|---|---|---|---|
| EP | 0181598 A2 | 5/1986 | |
| KR | 1020170082195 A | 7/2017 | |

(Continued)

OTHER PUBLICATIONS

Partial European Search Report for Application No. 22204142.8-1210 dated Mar. 9, 2023.

(Continued)

*Primary Examiner* — Douglas M Wilson
(74) *Attorney, Agent, or Firm* — CANTOR COLBURN LLP

(57) ABSTRACT

A display device includes a display panel including a plurality of sub-pixels arranged in a first pixel arrangement structure, and a display driver which receives input image data corresponding to a second pixel arrangement structure different from the first pixel arrangement structure. In a normal driving mode, the display driver generates first output image data for all of the plurality of sub-pixels by performing a first rending operation on the input image data, and drives all of the plurality of sub-pixels based on the first output image data. In a low power driving mode, the display driver generates second output image data for a portion of the plurality of sub-pixels by performing a second rending operation different from the first rending operation on the input image data, and drives the portion of the plurality of sub-pixels based on the second output image data.

18 Claims, 21 Drawing Sheets

(52) U.S. Cl.
CPC ............... *G09G 2320/0242* (2013.01); *G09G 2330/021* (2013.01); *G09G 2340/0457* (2013.01)

(58) Field of Classification Search
CPC ..... G09G 2330/021; G09G 2340/0457; G09G 2340/0407; G09G 3/20
See application file for complete search history.

(56) References Cited

U.S. PATENT DOCUMENTS

| | | | | |
|---|---|---|---|---|
| 2008/0131096 | A1 | 6/2008 | Magara | |
| 2012/0120209 | A1 | 5/2012 | Umeda et al. | |
| 2016/0240146 | A1* | 8/2016 | Lee | G09G 3/2003 |
| 2017/0025094 | A1 | 1/2017 | Koo et al. | |
| 2018/0012534 | A1* | 1/2018 | Park | G02B 27/0172 |
| 2019/0253697 | A1 | 8/2019 | Kim et al. | |
| 2020/0202791 | A1* | 6/2020 | Aflatooni | G09G 3/3275 |

FOREIGN PATENT DOCUMENTS

| | | | |
|---|---|---|---|
| KR | 1020150038958 | A | 1/2020 |
| KR | 1020200131392 | A | 11/2020 |
| KR | 1020200003429 | A | 2/2021 |

OTHER PUBLICATIONS

Extended European Search Report for Application No. 22204142.8-1210 dated May 23, 2023.

* cited by examiner

LOW POWER DRIVING MODE

NORMAL DRIVING MODE

LOW POWER DRIVING MODE

NORMAL DRIVING MODE

LOW POWER DRIVING MODE

NORMAL DRIVING MODE

LOW POWER DRIVING MODE

DISPLAY DEVICE AND METHOD OF OPERATING A DISPLAY DEVICE

This application claims priority to Korean Patent Application No. 10-2021-0145735, filed on Oct. 28, 2021, and all the benefits accruing therefrom under 35 U.S.C. §119, the content of which in its entirety is herein incorporated by reference.

BACKGROUND

1. Field

Embodiments of the invention relate to a display device, and more particularly to a display device operating in a normal driving mode and a low power driving mode, and a method of operating the display device.

2. Description of the Related Art

Each pixel of a display device may include a plurality of sub-pixels that emit different colors of light to display a full-color image. In general, each pixel may include a red sub-pixel, a green sub-pixel and a blue sub-pixel, and a display panel of the display device may have a stripe pixel arrangement structure in which a first column of red sub-pixels, a second column of green sub-pixels and a third column of blue sub-pixels are repeatedly arranged.

To increase a resolution of a display device, a display panel having a PENTILE® pixel arrangement structure, in which each pixel includes two sub-pixels, for example, a red sub-pixel (or a blue sub-pixel) and a green sub-pixel, has been developed. In particular, as one type of the PENTILE® pixel arrangement structure, a DIAMOND PIXEL® arrangement structure has been recently developed in which one red sub-pixel, one blue sub-pixel and two green sub-pixels are arranged in a diamond shape.

SUMMARY

Some embodiments provide a display device capable of operating in a normal driving mode and a low power driving mode with minimized or reduced image quality degradation in the low power driving mode.

Some embodiments provide a method of operating a display device in a normal driving mode with minimized or reduced image quality degradation in the low power driving mode.

According to an embodiment, a display device includes a display panel including a plurality of sub-pixels arranged in a first pixel arrangement structure, and a display driver which receives input image data corresponding to a second pixel arrangement structure different from the first pixel arrangement structure. In such an embodiment, when the display device is in a normal driving mode, the display driver generates first output image data for all of the plurality of sub-pixels by performing a first rending operation on the input image data, and drives all of the plurality of sub-pixels based on the first output image data. In such an embodiment, when the display device is in a low power driving mode, the display driver generates second output image data for a portion of the plurality of sub-pixels by performing a second rending operation different from the first rending operation on the input image data, and drives the portion of the plurality of sub-pixels based on the second output image data.

In an embodiment, the display panel may include a plurality of pixel groups, and each of the plurality of pixel groups may be defined by first and second red sub-pixels, first through fourth green sub-pixels and first and second blue sub-pixels. In such an embodiment, with respect to each of the plurality of pixel groups, the input image data may include first through fourth red sub-pixel data, first through fourth green sub-pixel data and first through fourth blue sub-pixel data.

In an embodiment, to perform the first rendering operation, the display driver may calculate sub-pixel data for the first red sub-pixel based on the first and second red sub-pixel data of the input image data, may calculate sub-pixel data for the second red sub-pixel based on the third and fourth red sub-pixel data of the input image data, may determine the first through fourth green sub-pixel data of the input image data as sub-pixel data for the first through fourth green sub-pixels, may calculate sub-pixel data for the first blue sub-pixel based on the first and second blue sub-pixel data, and may calculate sub-pixel data for the second blue sub-pixel based on the third and fourth blue sub-pixel data of the input image data.

In an embodiment, one red sub-pixel of the first and second red sub-pixels, two green sub-pixels of the first through fourth green sub-pixels, and one blue sub-pixel of the first and second blue sub-pixels in each of the plurality of pixel groups may be driven in the low power driving mode.

In an embodiment, the one red sub-pixel, the two green sub-pixels and the one blue sub-pixel driven in the low power driving mode may be arranged in a diamond shape.

In embodiments, to perform the second rendering operation, the display driver may calculate sub-pixel data for the one red sub-pixel based on the first through fourth red sub-pixel data of the input image data, may calculate sub-pixel data for the two green sub-pixels based on the first through fourth green sub-pixel data of the input image data, and may calculate sub-pixel data for the one blue sub-pixel based on the first through fourth blue sub-pixel data.

In an embodiment, to perform the second rendering operation, the display driver may calculate sub-pixel data for the one red sub-pixel based on the following equation: $RD=(IRD1+IRD2+IRD3+IRD4)/4$, where RD denotes the sub-pixel data for the one red sub-pixel, and IRD1, IRD2, IRD3 and IRD4 denote the first, second, third and fourth red sub-pixel data of the input image data, respectively, may calculate sub-pixel data for each of the two green sub-pixels based on the following equation: $GD=(IGD1+IGD2+IGD3+IGD4)/4$, where GD denotes the sub-pixel data for each of the two green sub-pixels, and IGD1, IGD2, IGD3 and IGD4 denote the first, second, third and fourth green sub-pixel data of the input image data, respectively, and may calculate sub-pixel data for the one blue sub-pixel based on the following equation: $BD=(IBD1+IBD2+IBD3+IBD4)/4$, where BD denotes the sub-pixel data for the one blue sub-pixel, and IBD1, IBD2, IBD3 and IBD4 denote the first, second, third and fourth blue sub-pixel data of the input image data, respectively.

In an embodiment, to perform the second rendering operation, the display driver may calculate sub-pixel data for the one red sub-pixel based on the following equation: $RD=(IRD1+IRD2+IRD3+IRD4)/4$, where RD denotes the sub-pixel data for the one red sub-pixel, and IRD1, IRD2, IRD3 and IRD4 denote the first, second, third and fourth red sub-pixel data of the input image data, respectively, may calculate sub-pixel data for a first one of the two green sub-pixels based on the following equation: GD1=(IGD1+

IGD3)/2, where GD1 denotes the sub-pixel data for the first one of the two green sub-pixels, and IGD1 and IGD3 denote the first and third green sub-pixel data of the input image data, respectively, may calculate sub-pixel data for a second one of the two green sub-pixels based on the following equation: GD2=(IGD2+IGD4)/2, where GD2 denotes the sub-pixel data for the second one of the two green sub-pixels, and IGD2 and IGD4 denote the second and fourth green sub-pixel data, respectively, and may calculate sub-pixel data for the one blue sub-pixel based on the following equation: BD=(IBD1+IBD2+IBD3+IBD4)/4, where BD denotes the sub-pixel data for the one blue sub-pixel, and IBD1, IBD2, IBD3 and IBD4 denote the first, second, third and fourth blue sub-pixel data of the input image data, respectively.

In an embodiment, the display driver may perform an edge dimming operation on the second output image data in the low power driving mode.

In an embodiment, to performs the edge dimming operation, the display driver may multiply sub-pixel data for sub-pixels located in an edge region among the portion of the plurality of sub-pixels by a dimming rate, and the dimming rate may be greater than or equal to 0, and is less than or equal to 1.

In an embodiment, the first pixel arrangement structure may be a diamond pixel arrangement structure, in which adjacent four sub-pixels are arranged in a diamond shape, and the second pixel arrangement structure is a stripe pixel arrangement structure.

In an embodiment, the display panel may include a plurality of pixel groups, and each of the plurality of pixel groups may include a first pixel defined by a first red sub-pixel and a first green sub-pixel, a second pixel located adjacent to the first pixel along a first direction and defined by a first blue sub-pixel and a second green sub-pixel, a third pixel located adjacent to the first pixel along a second direction and defined by a second blue sub-pixel and a third green sub-pixel, and a fourth pixel located adjacent to the second pixel along the second direction and adjacent to the third pixel along the first direction, and defined by a second red sub-pixel and a fourth green sub-pixel.

In an embodiment, the first green sub-pixel, the first blue sub-pixel, the second green sub-pixel and the second red sub-pixel in each of the plurality of pixel groups may be driven in the low power driving mode.

In an embodiment, the first green sub-pixel, the second blue sub-pixel, the third green sub-pixel and the second red sub-pixel in each of the plurality of pixel groups may be driven in the low power driving mode.

In an embodiment, the first green sub-pixel, the first blue sub-pixel, the second green sub-pixel and the second red sub-pixel in each of the plurality of pixel groups may be driven in a first frame period of the low power driving mode, and the first red sub-pixel, the second blue sub-pixel, the third green sub-pixel and the fourth green sub-pixel in each of the plurality of pixel groups may be driven in a second frame period of the low power driving mode.

In an embodiment, the display panel may include a plurality of pixel groups, and each of the plurality of pixel groups may include a first pixel defined by a first green sub-pixel and a first blue sub-pixel, a second pixel located adjacent to the first pixel along a first direction, and defined by a second green sub-pixel and a first red sub-pixel, a third pixel located adjacent to the first pixel along a second direction, and defined by a third green sub-pixel and a second red sub-pixel, and a fourth pixel located adjacent to the second pixel along the second direction and adjacent to the third pixel along the first direction, and defined by a fourth green sub-pixel and a second blue sub-pixel. In such an embodiment, the first green sub-pixel, the first blue sub-pixel, the second green sub-pixel and the second red sub-pixel in each of the plurality of pixel groups may be driven in the low power driving mode.

In an embodiment, the display panel may include a plurality of pixel groups, and each of the plurality of pixel groups may include a first pixel defined by a first blue sub-pixel and a first green sub-pixel, a second pixel located adjacent to the first pixel along a first direction, and having a first red sub-pixel and a second green sub-pixel, a third pixel located adjacent to the first pixel along a second direction, and defined by a second red sub-pixel and a third green sub-pixel, and a fourth pixel located adjacent to the second pixel along the second direction and adjacent to the third pixel along the first direction, and defined by a second blue sub-pixel and a fourth green sub-pixel. In such an embodiment, the first red sub-pixel, the third green sub-pixel, the second blue sub-pixel and the fourth green sub-pixel in each of the plurality of pixel groups may be driven in the low power driving mode.

In an embodiment, the display panel may include a plurality of pixel groups, and each of the plurality of pixel groups may include a first pixel defined by a first green sub-pixel and a first red sub-pixel, a second pixel located adjacent to the first pixel along a first direction, and defined by a second green sub-pixel and a first blue sub-pixel, a third pixel located adjacent to the first pixel along a second direction, and defined by a third green sub-pixel and a second blue sub-pixel, and a fourth pixel located adjacent to the second pixel along the second direction and adjacent to the third pixel along the first direction, and defined by a fourth green sub-pixel and a second red sub-pixel. In such an embodiment, the first red sub-pixel, the third green sub-pixel, the second blue sub-pixel and the fourth green sub-pixel in each of the plurality of pixel groups may be driven in the low power driving mode.

According to an embodiment, a method of operating a display device including a plurality of sub-pixels arranged in a first pixel arrangement structure includes receiving input image data corresponding to a second pixel arrangement structure different from the first pixel arrangement structure, generating first output image data for all of the plurality of sub-pixels by performing a first rending operation on the input image data when the display device is in a normal driving mode, driving all of the plurality of sub-pixels based on the first output image data when the display device is in the normal driving mode, generating second output image data for a portion of the plurality of sub-pixels by performing a second rending operation different from the first rending operation on the input image data when the display device is in a low power driving mode, and driving the portion of the plurality of sub-pixels based on the second output image data when the display device is in the low power driving mode.

In an embodiment, an edge dimming operation may be performed on the second output image data in the low power driving mode.

As described above, in embodiments of a display device and a method of operating the display device, when the display device is in a normal driving mode, first output image data corresponding to a first pixel arrangement structure of a display panel may be generated by performing a first rendering operation on input image data corresponding to a second pixel arrangement structure, and all of a plurality of sub-pixels of the display panel may be driven based on the first output image data. In such embodiments, when the display device is in a low power driving mode, second output image data for a portion of the plurality of sub-pixels may be generated by performing a second rendering operation different from the first rendering operation on the input image data, and the portion of the plurality of sub-pixels may be driven based on the second output image data. Accordingly, in such embodiments, power consumption of the display device may be reduced in the low power driving mode, and image quality degradation of the display device may be minimized or reduced.

BRIEF DESCRIPTION OF THE DRAWINGS

Illustrative, non-limiting embodiments will be more clearly understood from the following detailed description in conjunction with the accompanying drawings.

DETAILED DESCRIPTION

Figure 1:
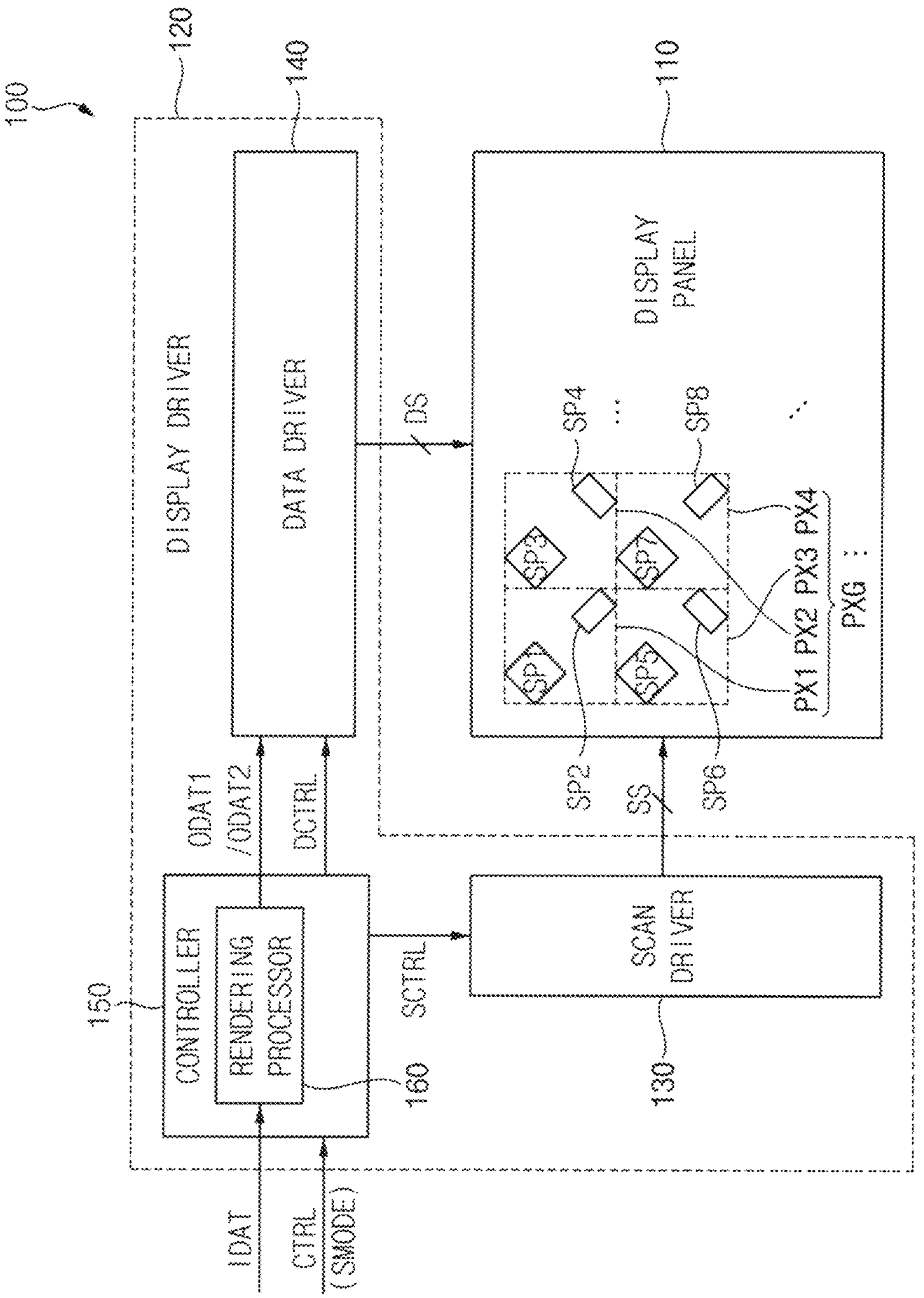
FIG. 1 is a block diagram illustrating a display device according to an embodiment.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being “on” another element, it can be directly on the other element or intervening elements may be therebetween. In contrast, when an element is referred to as being “directly on” another element, there are no intervening elements present.

It will be understood that, although the terms “first,” “second,” “third” etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, “a first element,” “component,” “region,” “layer” or “section” discussed below could be termed a second element, component, region, layer or section without departing from the teachings herein.

The terminology used herein is for the purpose of describing particular embodiments only and is not intended to be limiting. As used herein, “a”, “an,” “the,” and “at least one” do not denote a limitation of quantity, and are intended to include both the singular and plural, unless the context clearly indicates otherwise. For example, “an element” has the same meaning as “at least one element,” unless the context clearly indicates otherwise. “At least one” is not to be construed as limiting “a” or “an.” “Or” means “and/or.” As used herein, the term “and/or” includes any and all combinations of one or more of the associated listed items. It will be further understood that the terms “comprises” and/or “comprising,” or “includes” and/or “including” when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as “lower” or “bottom” and “upper” or “top,” may be used herein to describe one element’s relationship to another element as illustrated in the Figures. It will be understood that relative terms are intended to encompass different orientations of the device in addition to the orientation depicted in the Figures. For example, if the device in one of the figures is turned over, elements described as being on the “lower” side of other elements would then be oriented on “upper” sides of the other elements. The term “lower,” can therefore, encompasses both an orientation of “lower” and “upper,” depending on the particular orientation of the figure. Similarly, if the device in one of the figures is turned over, elements described as “below” or “beneath” other elements would then be oriented “above” the other elements. The terms “below” or “beneath” can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the disclosure, and will not be interpreted in an idealized or overly formal sense unless expressly so defined herein.

Embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Hereinafter, embodiments of the invention will be described in detail with reference to the accompanying drawings.

FIG. 1 is a block diagram illustrating a display device according to an embodiment.

Referring to FIG. 1, an embodiment of a display device 100 may include a display panel 110 that includes a plurality of sub-pixels SP1, SP2, SP3, SP4, SPS, SP6, SP7 and SP8, and a display driver 120 that drives the display panel 110. The display driver 120 may include a scan driver 130 that provides scan signals SS to the plurality of sub-pixels SP1 through SP8, a data driver 140 that provides data signals DS to the plurality of sub-pixels SP1 through SP8, and a controller 150 that controls the scan driver 130 and the data driver 140.

The display panel 110 may include a plurality of data lines, a plurality of scan lines, and a plurality of pixels coupled to the plurality of data lines and the plurality of scan lines. In an embodiment, each sub-pixel SP1 through SP8 may include at least two transistors, at least one capacitor and a light emitting element, and the display panel 110 may be a light emitting display panel. In an embodiment, for example, the light emitting element may be an organic light emitting diode (“OLED”), a quantum dot (“QD”) light emitting element, or any other suitable light emitting element. In an alternative embodiment, each sub-pixel SP1 through SP8 may include a switching transistor, and a liquid crystal capacitor coupled to the switching transistor, and the display panel 110 may be a liquid crystal display (“LCD”) panel. However, the display panel 110 may not be limited to the light emitting display panel and the LCD panel, and may be any suitable display panel.

The plurality of sub-pixels SP1 through SP8 of the display panel 110 may be arranged in a first pixel arrangement structure. In an embodiment, the first pixel arrangement structure may be a PENTILE® pixel arrangement structure in which each pixel (e.g., a first pixel PX1) includes two sub-pixels (e.g., a first sub-pixel SP1 and a second sub-pixel SP2). In an embodiment, for example, the display panel 110 may include a plurality of pixel groups PXG arranged in a matrix form, and each pixel group PXG may include a first pixel PX1 having (or defined by) a first sub-pixel SP2 and a second sub-pixel SP2, a second pixel PX2 located adjacent to the first pixel PX1 along (or in) a first direction (e.g., a row direction) and having a third sub-pixel SP3 and a fourth sub-pixel SP4, a third pixel PX3 located adjacent to the first pixel PX1 along a second direction (e.g., a column direction) and having a fifth sub-pixel SP5 and a sixth sub-pixel SP6, and a fourth pixel PX4 located adjacent to the second pixel PX2 along the second direction and adjacent to the third pixel PX3 along the first direction and having a seventh sub-pixel SP7 and an eighth sub-pixel SP8. In an embodiment, as illustrated in FIG. 1, adjacent four sub-pixels (e.g., the second sub-pixel SP2, the third sub-pixel SP3, the fourth sub-pixel SP4 and the seventh sub-pixel SP7) may be arranged in a diamond shape. A pixel arrangement structure where adjacent four sub-pixels are arranged in the diamond shape as illustrated in FIG. 1 may be referred to as a DIAMOND PIXEL® arrangement structure.

The scan driver 130 may generate the scan signals SS based on a scan control signal SCTRL received from the controller 150, and may sequentially provide the scan signals SS to the plurality of sub-pixels SP1 through SP8 on a row-by-row basis through the plurality of scan lines. In an embodiment, the scan control signal SCTRL may include, but not limited to, a scan start signal, a scan clock signal, etc. In an embodiment, the scan driver 130 may be integrated or formed in a peripheral portion adjacent to a display region of the display panel 110. In an alternative embodiment, the scan driver 130 may be integrated or formed within the display region of the display panel 110. In another alternative embodiment, the scan driver 130 may be implemented in a form of an integrated circuit.

The data driver 140 may generate the data signals DS based on output image data ODAT1/ODAT2 and a data control signal DCTRL received from the controller 150, and may provide the data signals DS to the plurality of sub-pixels SP1 through SP8 through the plurality of data lines. In an embodiment, when the display device 100 is in a normal driving mode, the data driver 140 may receive first output image data ODAT1 for all of the plurality of sub-pixels SP1 through SP8, and may provide the data signals DS to all of the plurality of sub-pixels SP1 through SP8 based on the first output image data ODAT1. In such an embodiment, when the display device 100 is in a low power driving mode, the data driver 140 may receive second output image data ODAT2 for a portion of the plurality of sub-pixels SP1 through SP8, and may provide the data signals DS to the portion of the plurality of sub-pixels SP1 through SP8 based on the second output image data ODAT2 to drive the portion of the plurality of sub-pixels SP1 through SP8. In an embodiment, no data voltage is applied to the remaining portion of the plurality of sub-pixels SP1 through SP8 that is not driven in the low power driving mode. In an alternative embodiment, a black data voltage or a minimum gray data voltage (e.g., a 0-gray data voltage) may be applied to the remaining portion of the plurality of sub-pixels SP1 through SP8 that is not driven in the low power driving mode. In an embodiments the data driver 140 and the controller 150 may be implemented with a single integrated circuit, and the single integrated circuit may be referred to as a timing controller embedded data driver. In other embodiments, the data driver 140 and the controller 150 may be implemented with separate integrated circuits.

The controller 150 (e.g., a timing controller ("TCON")) may receive input image data IDAT and a control signal CTRL from an external host processor (e.g., an application processor ("AP"), a graphics processing unit ("GPU"), a graphics card, etc.). The input image data IDAT may be suitable for a second pixel arrangement structure different from the first pixel arrangement structure. In an embodiment, the second pixel arrangement structure may be a stripe pixel arrangement structure, and the input image data IDAT may be RGB stripe image data including red sub-pixel data, green sub-pixel data and blue sub-pixel data for each pixel. The control signal CTRL may include a mode signal SMODE representing a driving mode of the display device 100. In an embodiment, for example, the mode signal SMODE may represent the normal driving mode or the low power driving mode. In an embodiment, the control signal CTRL may further include, but not limited to, a vertical synchronization signal, a horizontal synchronization signal, an input data enable signal, a master clock signal, etc. The controller 150 may generate the output image data ODAT1/ODAT2, the data control signal DCTRL and the scan control signal SCTRL based on the input image data IDAT and the control signal CTRL. The controller 150 may control an operation of the scan driver 130 by providing the scan control signal SCTRL to the scan driver 130, and may control an operation of the data driver 140 by providing the output image data ODAT1/ODAT2 and the data control signal DCTRL to the data driver 140.

In an embodiment of the display device 100, the controller 150 may include a rendering processor 160 that generates the output image data ODAT1/ODAT2 by performing a rendering process on the input image data IDAT. In an embodiment, when the display device 100 is in the normal driving mode, the rendering processor 160 may generate the first output image data ODAT1 corresponding to the first pixel arrangement structure by performing a first rending operation on the input image data IDAT corresponding to the second pixel arrangement structure, and the data driver 140 may drive all of the plurality of sub-pixels SP1 through SP8 based on the first output image data ODAT1. In such an embodiment, when the display device 100 is in the low power driving mode, the rendering processor 160 may generate the second output image data ODAT2 for the portion of the plurality of sub-pixels SP1 through SP8 by performing a second rending operation different from the first rending operation on the input image data IDAT, and the data driver 140 may drive the portion of the plurality of sub-pixels SP1 through SP8 based on the second output image data ODAT2.

As described above, in embodiments of the display device 100, since the portion of the plurality of sub-pixels SP1 through SP8 is driven in the low power driving mode, power consumption of the display device 100 may be reduced in the low power driving mode. In such embodiments, the second rending operation may be suitable for the portion of the plurality of sub-pixels SP1 through SP8 driven in the low power driving mode, and thus image quality degradation in the low power driving mode may be minimized or reduced.

Figure 2:
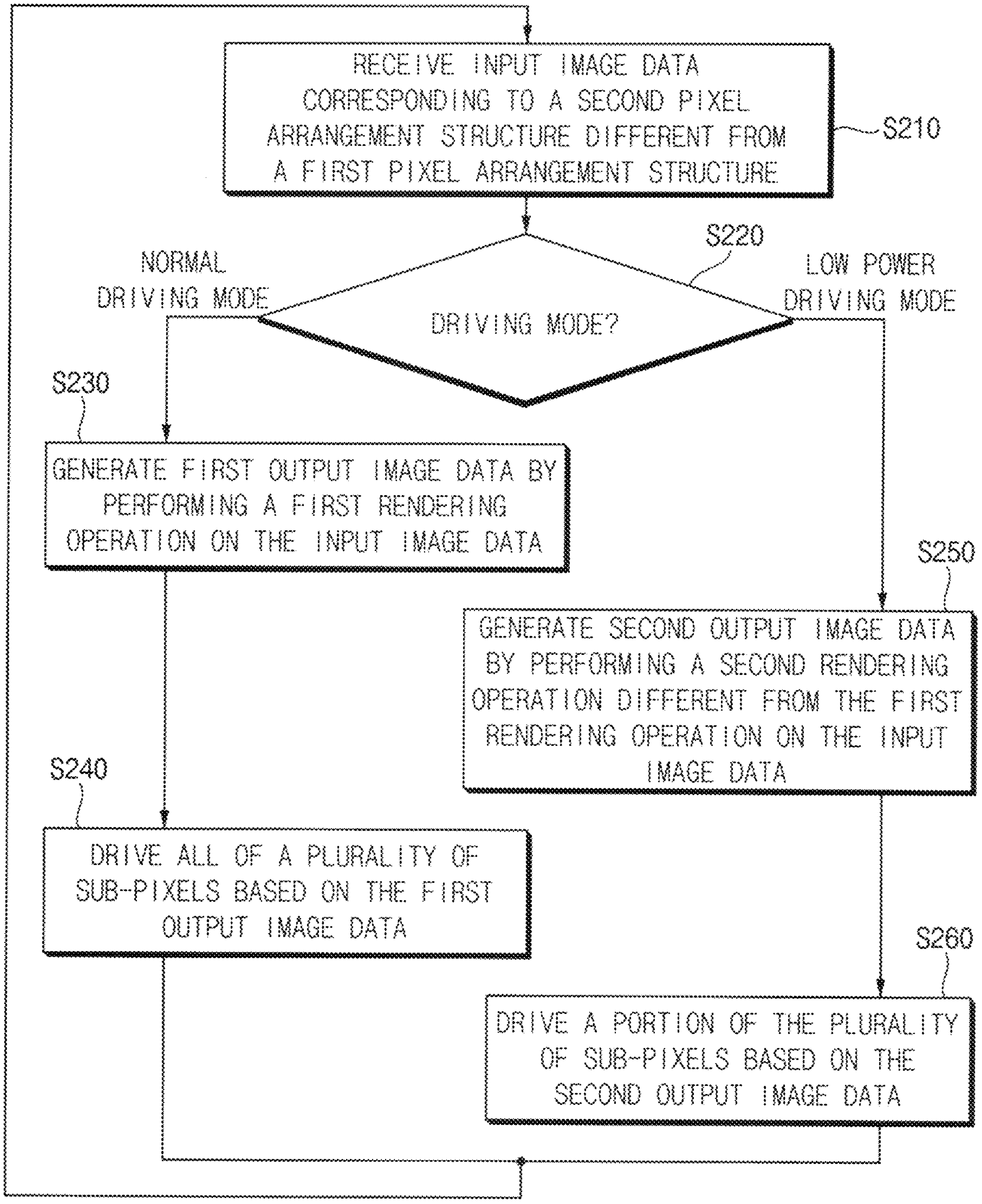
FIG. 2 is a flowchart illustrating a method of operating a display device according to an embodiment.
Figure 3:
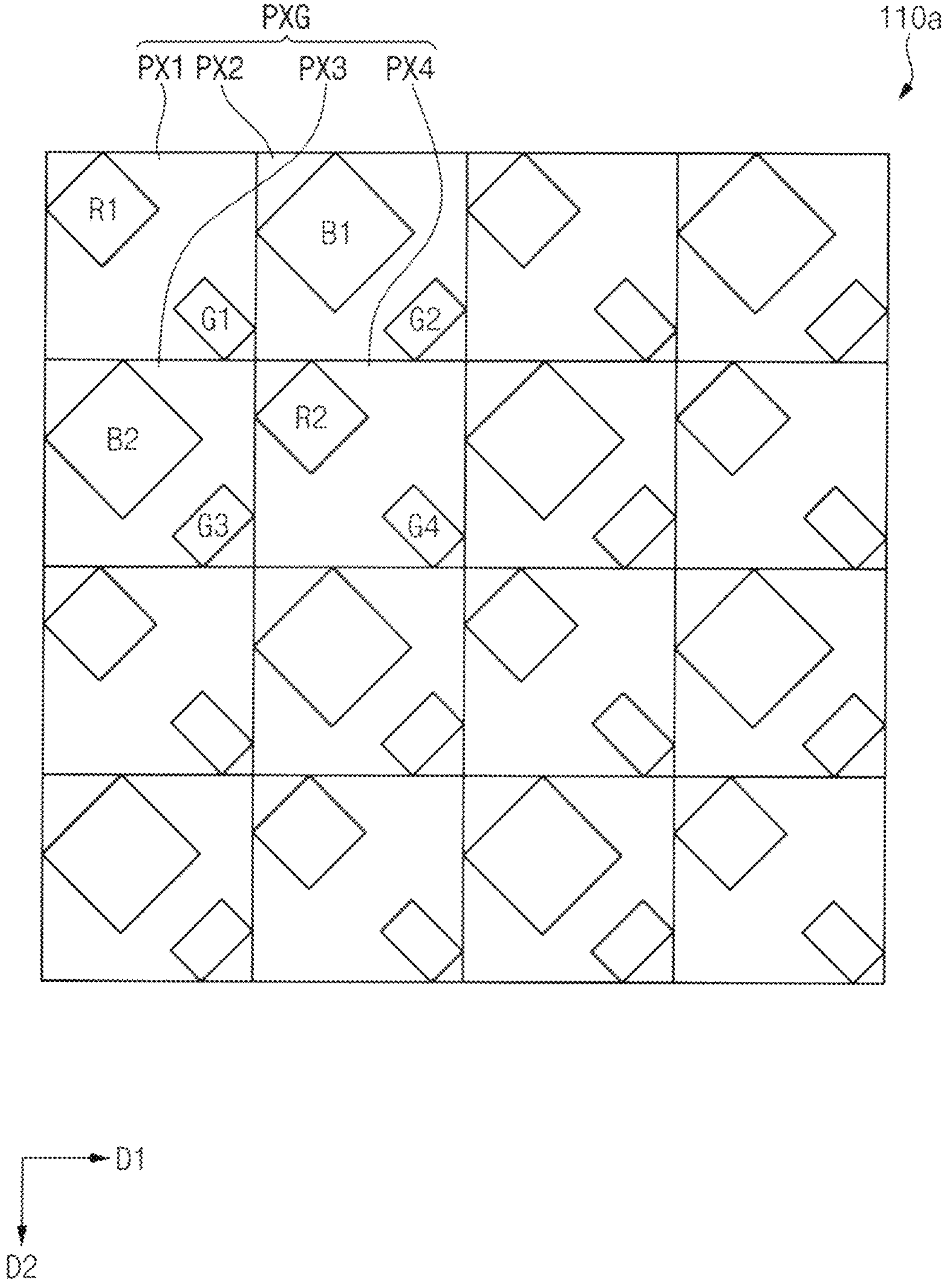
FIG. 3 is a diagram illustrating an embodiment of a display panel of a display device.
Figure 4:
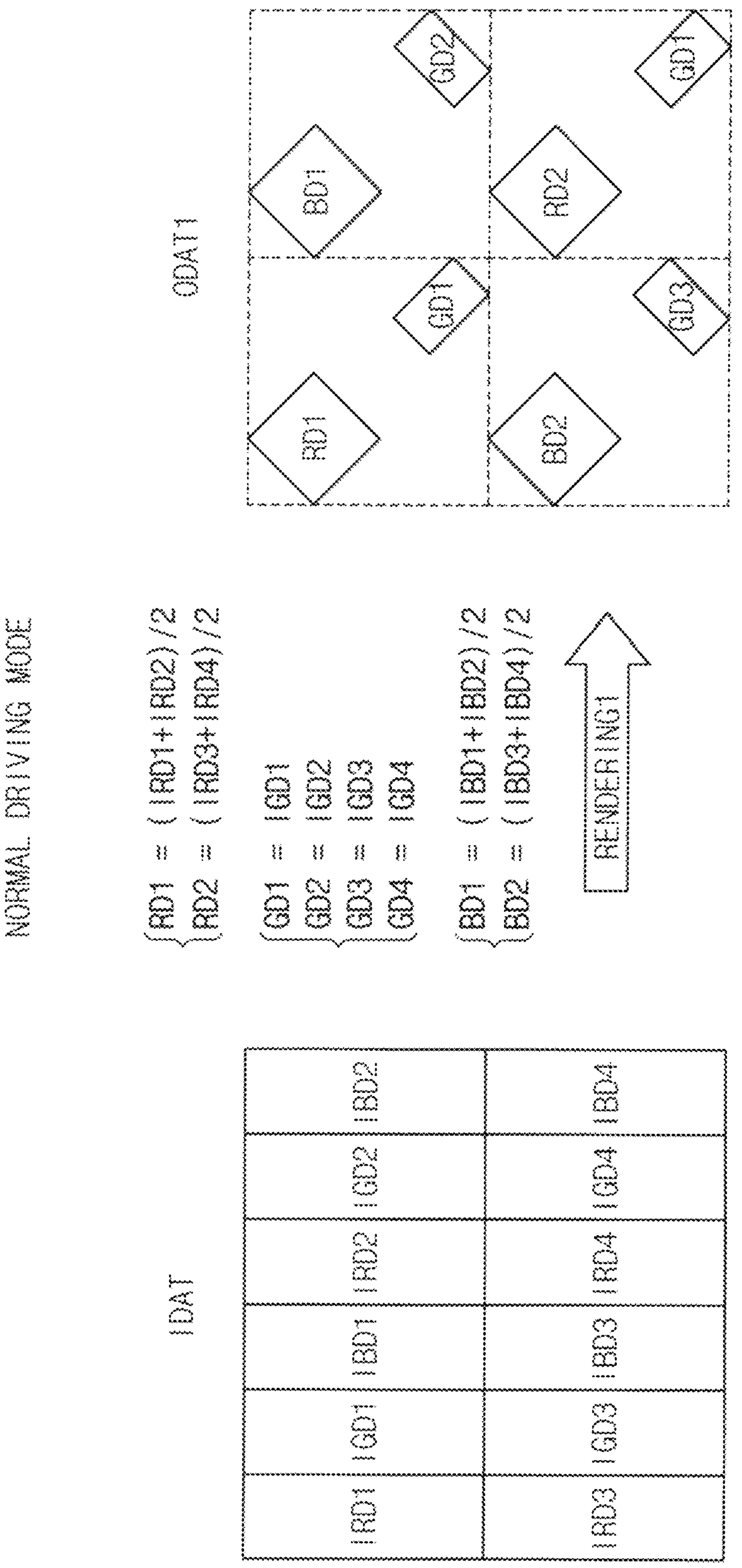
FIG. 4 is a diagram for describing an embodiment of a first rendering operation of a display device in a normal driving mode.
Figure 5A:
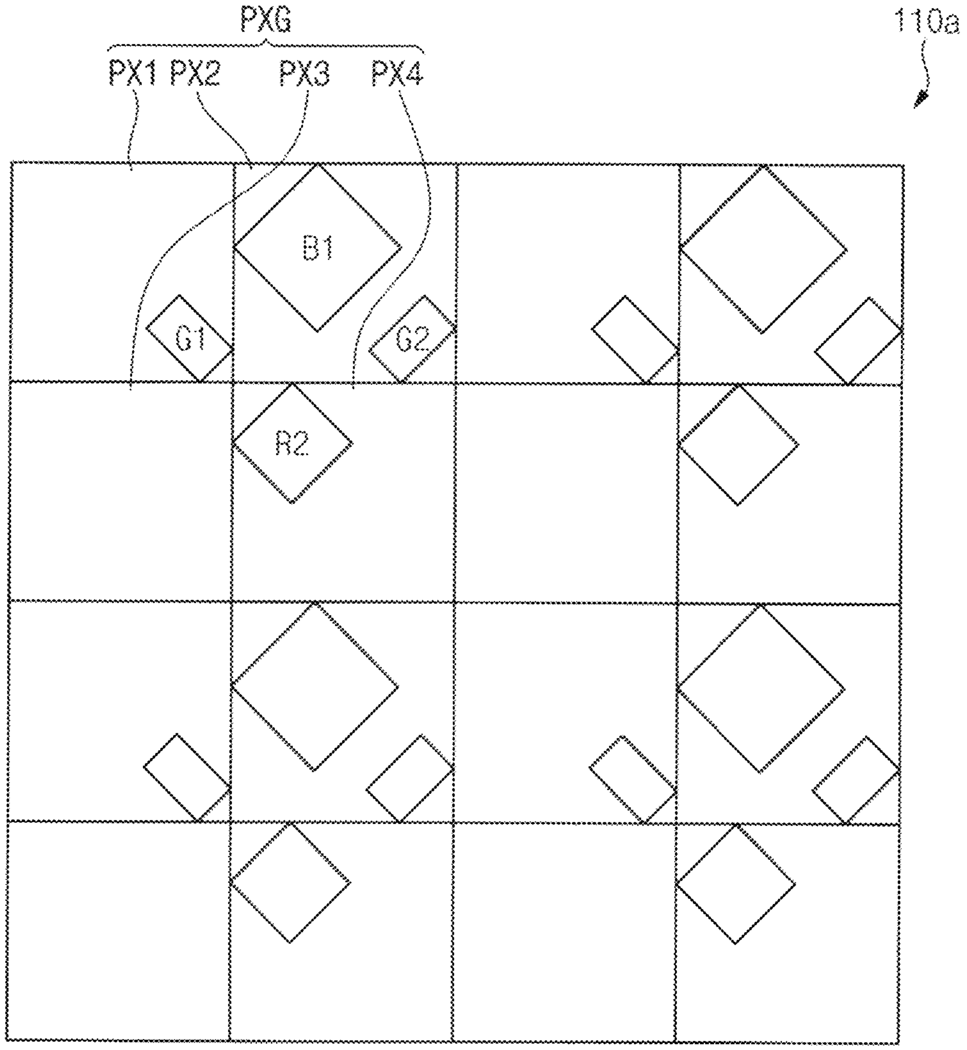
FIG. 5A is a diagram illustrating an embodiment of a display panel driven in a low power driving mode in a display device.
Figure 5B:
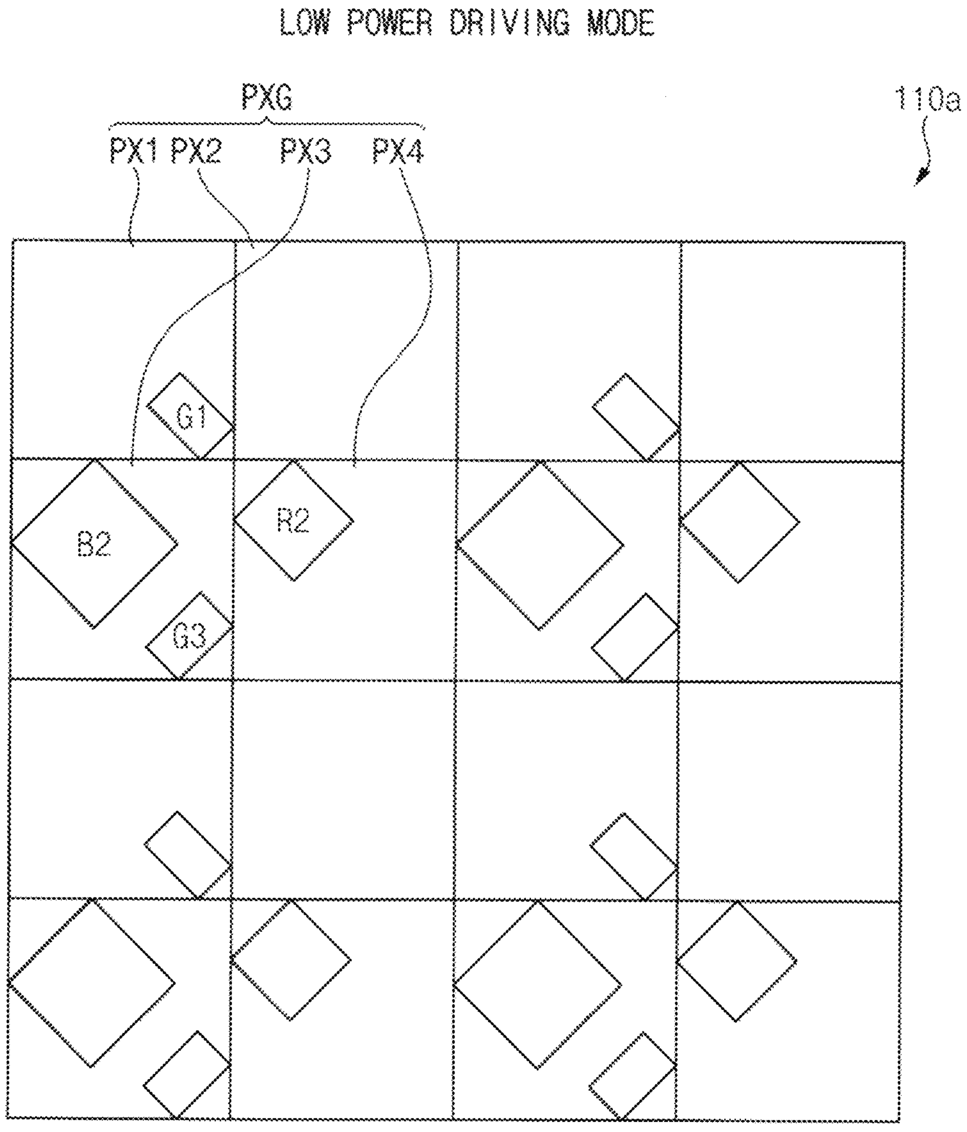
FIG. 5B is a diagram illustrating an alternative embodiment of a display panel driven in a low power driving mode in a display device.
Figure 6A:
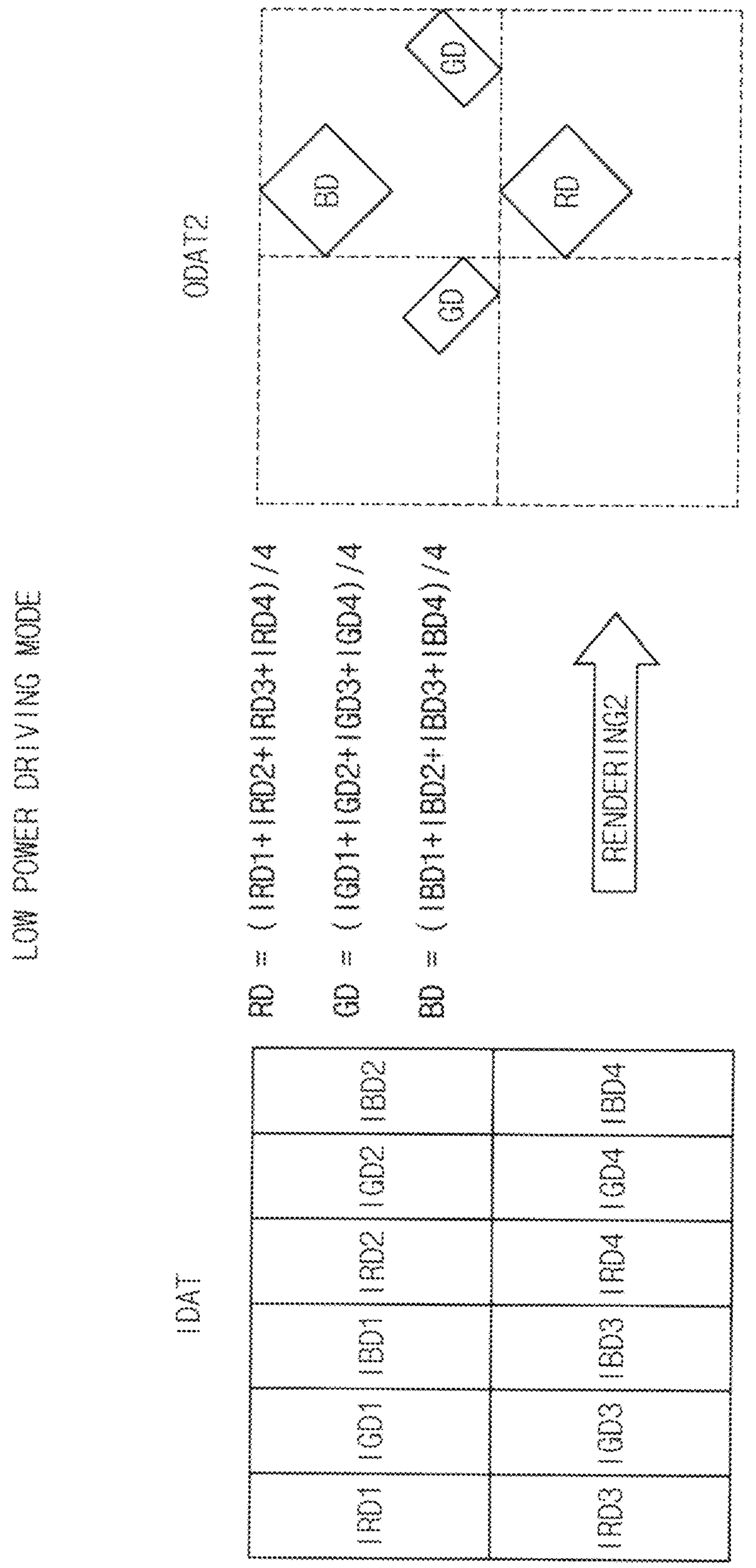
FIG. 6A is a diagram for describing an example of a second rendering operation of a display device in a low power driving mode.
Figure 6B:
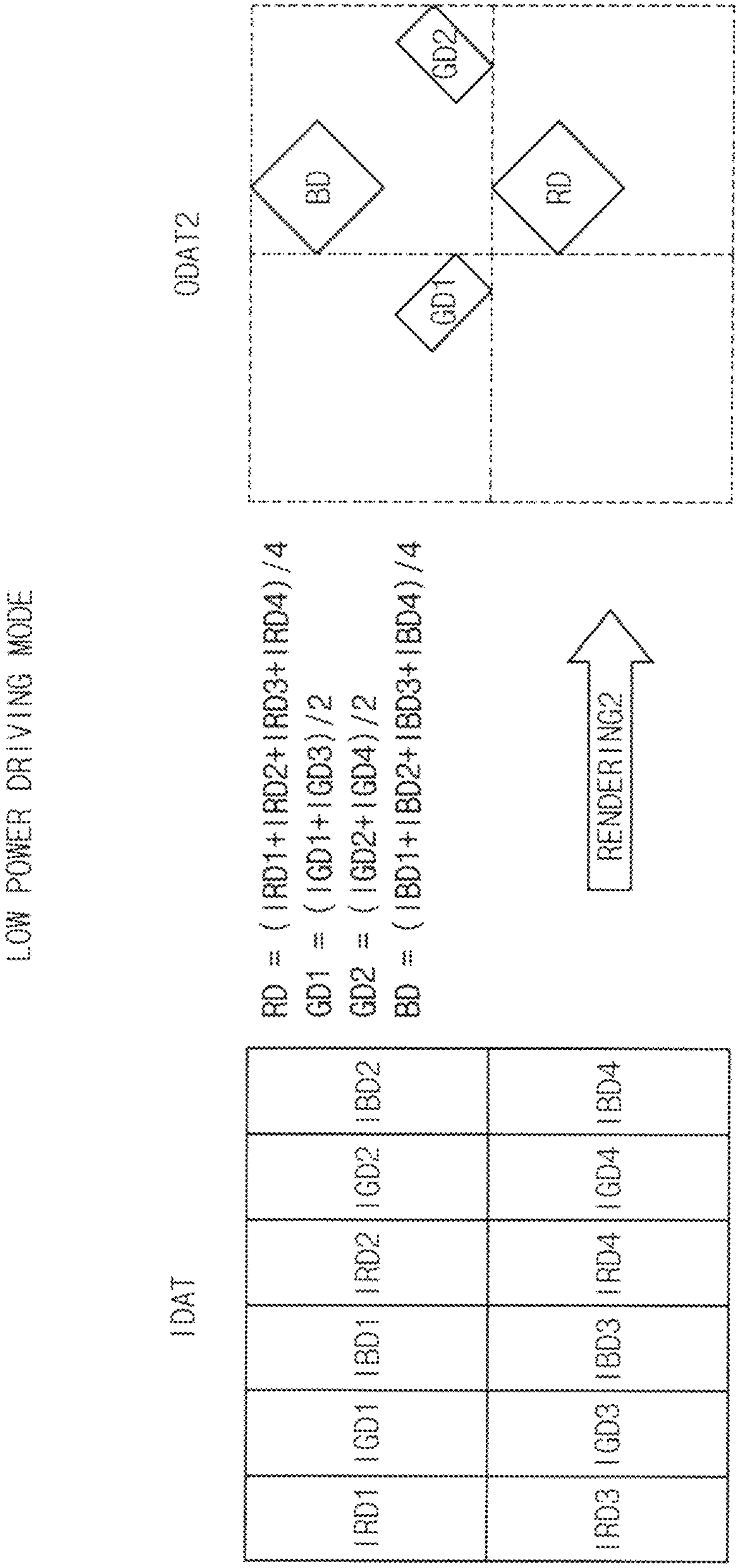
FIG. 6B is a diagram for describing an embodiment of a second rendering operation of a display device in a low power driving mode.
Figure 7:
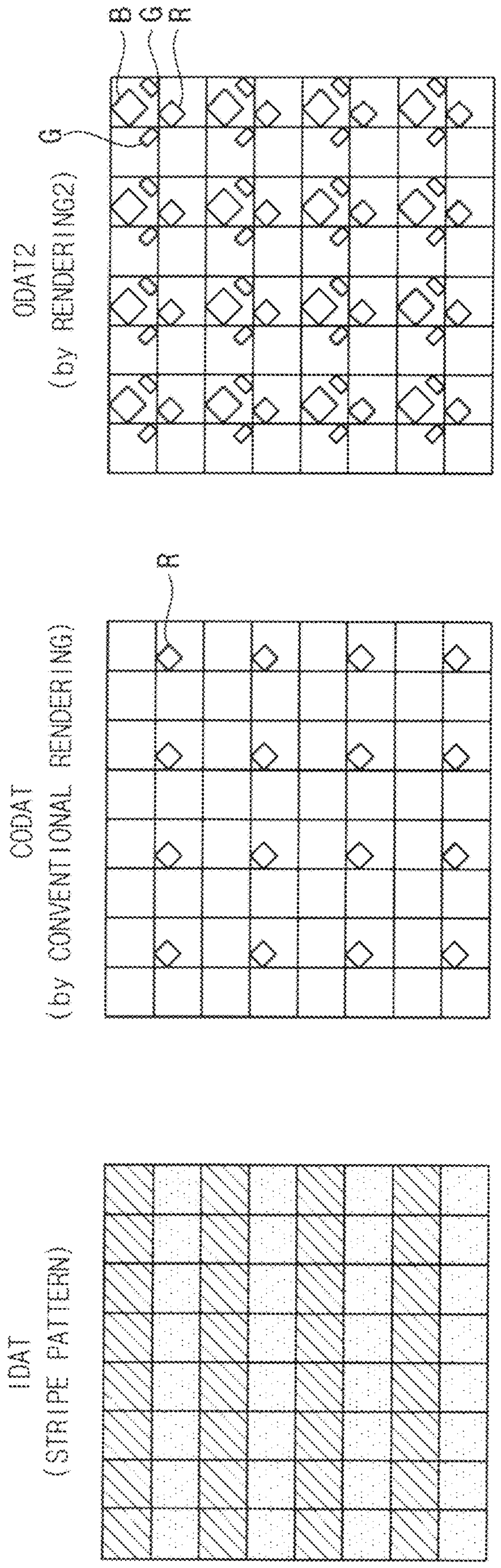
FIG. 7 is a diagram illustrating embodiments of conventional output image data generated by a conventional rendering operation and output image data generated by a second rendering operation in a case where input image data having a stripe pattern are received.

FIG. 2 is a flowchart illustrating a method of operating a display device according to an embodiment, FIG. 3 is a diagram illustrating an embodiment of a display panel of a display device, FIG. 4 is a diagram for describing an embodiment of a first rendering operation of a display device in a normal driving mode, FIG. 5A is a diagram illustrating an embodiment of a display panel driven in a low power driving mode in a display device, FIG. 5B is a diagram illustrating an alternative embodiment of a display panel driven in a low power driving mode in a display device, FIG. 6A is a diagram for describing an embodiment of a second rendering operation of a display device in a low power driving mode, FIG. 6B is a diagram for describing an embodiment of a second rendering operation of a display device in a low power driving mode, and FIG. 7 is a diagram illustrating embodiments of conventional output image data generated by a conventional rendering operation and output image data generated by a second rendering operation in a case where input image data having a stripe pattern are received.

Referring to FIG. 2, in an embodiment of a method of operating a display device including a plurality of sub-pixels arranged in a first pixel arrangement structure, a display driver of the display device may receive input image data corresponding to a second pixel arrangement structure different from the first pixel arrangement structure (S210). In an embodiment, the first pixel arrangement structure may be a DIAMOND PIXEL® arrangement structure, and the second pixel arrangement structure may be a stripe pixel arrangement structure.

In an embodiment, as illustrated in FIG. 3, a display panel 110*a* may include a plurality of pixel groups PXG, and each pixel group PXG may include first and second red sub-pixels R1 and R2, first, second, third and fourth green sub-pixels G1, G2, G3 and G4 and first and second blue sub-pixels B1 and B2. In an embodiment, for example, each pixel group PXG may include a first pixel PX1 having the first red sub-pixel R1 and the first green sub-pixel G1, a second pixel PX2 located adjacent to the first pixel PX1 along a first direction D1 (e.g., a row direction) and having the first blue sub-pixel B1 and the second green sub-pixel G2, a third pixel PX3 located adjacent to the first pixel PX1 along a second direction D2 (e.g., a column direction) and having the second blue sub-pixel B2 and the third green sub-pixel G3, and a fourth pixel PX4 located adjacent to the second pixel PX2 along the second direction D2 and adjacent to the third pixel PX3 along the first direction D1 and having the second red sub-pixel R2 and the fourth green sub-pixel G4. In an embodiment, one red sub-pixel (e.g., the second red sub-pixel R2), two green sub-pixels (e.g., the first and second green sub-pixels G1 and G2) and one blue sub-pixel (e.g., the first blue sub-pixel B1) may be arranged in a diamond shape in the display panel 110*a*.

In an embodiment, as illustrated in FIG. 4, with respect to each pixel group PXG, the input image data IDAT may include first, second, third and fourth red sub-pixel data IRD1, IRD2, IRD3 and IRD4, first, second, third and fourth green sub-pixel data IGD1, IGD2, IGD3 and IGD4, and first, second, third and fourth blue sub-pixel data IBD1, IBD2, IBD3 and IBD4. In an embodiment, for example, the input image data IDAT may include the first red, green and blue sub-pixel data IRD1, IGD1 and IBD1 with respect to the first pixel PX1, the second red, green and blue sub-pixel data IRD2, IGD2 and IBD2 with respect to the second pixel PX2, the third red, green and blue sub-pixel data IRD3, IGD3 and IBD3 with respect to the third pixel PX3, and the fourth red, green and blue sub-pixel data IRD4, IGD4 and IBD4 with respect to the fourth pixel PX4.

Referring back to FIG. 2, in a case where a driving mode of the display device is a normal driving mode (S220: NORMAL DRIVING MODE), or in a case where the display device receives a mode signal representing the normal driving mode, the display driver may generate first output image data for all of the plurality of sub-pixels by performing a first rending operation on the input image data (S230), and may drive all of the plurality of sub-pixels based on the first output image data (S240).

In an embodiment, as illustrated in FIGS. 3 and 4, to perform the first rendering operation RENDERING1, the display driver may calculate sub-pixel data RD1 for the first red sub-pixel R1 based on the first and second red sub-pixel data IRD1 and IRD2, may calculate sub-pixel data RD2 for the second red sub-pixel R2 based on the third and fourth red sub-pixel data IRD3 and IRD4, may determine the first through fourth green sub-pixel data IGD1, IGD2, IGD3 and IGD4 as sub-pixel data GD1, GD2, GD3 and GD4 for the first through fourth green sub-pixels G1, G2, G3 and G4, may calculate sub-pixel data BD1 for the first blue sub-pixel B1 based on the first and second blue sub-pixel data IBD1 and IBD2, and may calculate sub-pixel data BD2 for the second blue sub-pixel B2 based on the third and fourth blue sub-pixel data IBD3 and IBD4. In an embodiment, for example, the display driver may calculate the sub-pixel data RD1 and RD2 for the first and second red sub-pixels R1 and R2 based on or by using the following equations "RD1=(IRD1+IRD2)/2" and "RD2=(IRD3+IRD4)/2", may determine the sub-pixel data GD1, GD2, GD3 and GD4 for the first through fourth green sub-pixels G1, G2, G3 and G4 by using the following equations "GD1=IGD1", "GD2=IGD2", "GD3=IGD3" and "GD4=IGD4", and may calculate the sub-pixel data BD1 and BD2 for the first and second blue sub-pixels B1 and B2 by using the following equations "BD1=(IBD1+IBD2)/2" and "BD2=(IBD3+IBD4)/2", where IRD1, IRD2, IRD3 and IRD4 denote the first, second, third and fourth red sub-pixel data of the input image data IDAT, respectively, IGD1, IGD2, IGD3 and IGD4 denote the first, second, third and fourth green sub-pixel data of the input image data IDAT, respectively, IBD1, IBD2, IBD3 and IBD4 denote the first, second, third and fourth blue sub-pixel data of the input image data IDAT, respectively, RD1 and RD2 denote the sub-pixel data for the first and second red sub-pixels R1 and R2, respectively, GD1, GD2, GD3 and GD4 denote the sub-pixel data for the first, second, third and fourth green sub-pixels G1, G2, G3 and G4, respectively, and BD1 and BD2 denote the sub-pixel data for the first and second blue sub-pixels B1 and B2, respectively. Accordingly, the input image data IDAT corresponding to the stripe pixel arrangement structure may be converted into the first output image data ODAT1 corresponding to the DIAMOND PIXEL® arrangement structure.

Referring back to FIG. 2, in a case where the driving mode of the display device is a low power driving mode (S220: LOW POWER DRIVING MODE), or in a case where the display device receives the mode signal representing the low power driving mode, the display driver may generate second output image data for a portion of the plurality of sub-pixels by performing a second rending operation different from the first rending operation on the input image data (S250), and may drive the portion of the plurality of sub-pixels based on the second output image data (S260).

In an embodiment, with respect to each pixel group PXG illustrated in FIG. 3, one red sub-pixel of the first and second red sub-pixels R1 and R2, two green sub-pixels of the first through fourth green sub-pixels G1, G2, G3 and G4, and one blue sub-pixel of the first and second blue sub-pixels B1 and B2 may be driven in the low power driving mode. In such an embodiment, the one red sub-pixel, the two green sub-pixels and the one blue sub-pixel driven in the low power driving mode may be arranged in the diamond shape.

In an embodiment, for example, as illustrated in FIGS. 3 and 5A, each pixel group PXG may include the first pixel PX1 having the first red sub-pixel R1 and the first green sub-pixel G1, the second pixel PX2 having the first blue sub-pixel B1 and the second green sub-pixel G2, the third pixel PX3 having the second blue sub-pixel B2 and the third green sub-pixel G3, and the fourth pixel PX4 having the second red sub-pixel R2 and the fourth green sub-pixel G4. In the low power driving mode, the first green sub-pixel G1, the first blue sub-pixel B1, the second green sub-pixel G2 and the second red sub-pixel R2 may be driven, and the first red sub-pixel R1, the second blue sub-pixel B2, the third green sub-pixel G3 and the fourth green sub-pixel G4 may not be driven. Thus, in the low power driving mode, the first green sub-pixel G1, the first blue sub-pixel B1, the second green sub-pixel G2 and the second red sub-pixel R2 arranged in the diamond shape may emit light, and the first red sub-pixel R1, the second blue sub-pixel B2, the third green sub-pixel G3 and the fourth green sub-pixel G4 may not emit light. Accordingly, power consumption of the display device may be reduced in the low power driving mode. In an embodiment, no data voltage may be applied to the first red sub-pixel R1, the second blue sub-pixel B2, the third green sub-pixel G3 and the fourth green sub-pixel G4 that are not driven in the low power driving mode. In other embodiments, a black data voltage or a minimum gray data voltage (e.g., a 0-gray data voltage) may be applied to the first red sub-pixel R1, the second blue sub-pixel B2, the third green sub-pixel G3 and the fourth green sub-pixel G4 that are not driven in the low power driving mode.

However, the sub-pixels G1, B1, G2 and R2 driven in the low power driving mode are not limited to an example of FIG. 5. In an embodiment, for example, in the low power driving mode, as illustrated in FIGS. 3 and 5B, the first green sub-pixel G1, the second blue sub-pixel B2, the third green sub-pixel G3 and the second red sub-pixel R2 may be driven, and the first red sub-pixel R1, the first blue sub-pixel B1, the second green sub-pixel G2 and the fourth green sub-pixel G4 may not be driven. Thus, in the low power driving mode, the first green sub-pixel G1, the second blue sub-pixel B2, the third green sub-pixel G3 and the second red sub-pixel R2 arranged in the diamond shape may emit light, and the first red sub-pixel R1, the first blue sub-pixel B1, the second green sub-pixel G2 and the fourth green sub-pixel G4 may not emit light.

In an embodiment, the display driver may perform the second rendering operation suitable for the portion of the plurality of sub-pixels driven in the low power driving mode. In an embodiment, in the low power driving mode, one red sub-pixel R2, two sub-pixels G1 and G2 and one blue sub-pixel B1 of each pixel group PXG may be driven as illustrated in FIG. 5A. In an embodiment, as illustrated in FIGS. 6A and 6B, to perform the second rendering operation RENDERING2, the display driver may generate the second output image data ODAT2 by calculating the sub-pixel data RD for the one red sub-pixel R2 based on the first through fourth red sub-pixel data IRD1, IRD2, IRD3 and IRD4, by calculating the sub-pixel data GD (or GD1 and GD2) for the two green sub-pixels G1 and G2 based on the first through fourth green sub-pixel data IGD1, IGD2, IGD3 and IGD4, and by calculating the sub-pixel data BD for the one blue sub-pixel B1 based on the first through fourth blue sub-pixel data IBD1, IBD2, IBD3 and IBD4.

In an embodiment, as illustrated in FIGS. 5A and 6A, to perform the second rendering operation RENDERING2, the display driver may calculate the sub-pixel data RD for the one red sub-pixel R2 by using the following equation "RD=(IRD1+IRD2+IRD3+IRD4)/4", where RD denotes the sub-pixel data for the one red sub-pixel R2, and IRD1, IRD2, IRD3 and IRD4 denote the first, second, third and fourth red sub-pixel data, respectively. In such an embodiment, the display driver may calculate the sub-pixel data GD for each of the two green sub-pixels G1 and G2 by using the following equation "GD=(IGD1+IGD2+IGD3+IGD4)/4", where GD represents the sub-pixel data for each of the two green sub-pixels G1 and G2, and IGD1, IGD2, IGD3 and IGD4 denote the first, second, third and fourth green sub-pixel data, respectively. In such an embodiment, the display driver may calculate the sub-pixel data BD for the one blue sub-pixel B1 by using the following equation "BD=(IBD1+IBD2+IBD3+IBD4)/4", where BD denotes the sub-pixel data for the one blue sub-pixel B1, and IBD1, IBD2, IBD3 and IBD4 denote the first, second, third and fourth blue sub-pixel data, respectively.

In an alternative embodiment, as illustrated in FIGS. 5A and 6B, to perform the second rendering operation RENDERING2, the display driver may calculate the sub-pixel data RD for the one red sub-pixel R2 by using the following equation "RD=(IRD1+IRD2+IRD3+IRD4)/4", where RD represents the sub-pixel data for the one red sub-pixel R2, and IRD1, IRD2, IRD3 and IRD4 denote the first, second, third and fourth red sub-pixel data, respectively. In such an embodiment, the display driver may calculate the sub-pixel data GD1 for a first one G1 of the two green sub-pixels G1 and G2 by using the following equation "GD1=(IGD1+IGD3)/2", where GD1 denotes the sub-pixel data for the first one G1 of the two green sub-pixels G1 and G2, and IGD1 and IGD3 denote the first and third green sub-pixel data, respectively. In such an embodiment, the display driver may calculate the sub-pixel data GD2 for a second one G2 of the two green sub-pixels G1 and G2 by using the following equation "GD2=(IGD2+IGD4)/2", where GD2 denotes the sub-pixel data for the second one G2 of the two green sub-pixels G1 and G2, and IGD2 and IGD4 denote the second and fourth green sub-pixel data, respectively. In such an embodiment, the display driver may calculate the sub-pixel data BD for the one blue sub-pixel B1 by using the following equation "BD=(IBD1+IBD2+IBD3+IBD4)/4", where BD denotes the sub-pixel data for the one blue sub-pixel B1, and IBD1, IBD2, IBD3 and IBD4 denote the first, second, third and fourth blue sub-pixel data, respectively.

In a case where output image data are generated by a conventional rendering operation or the first rendering operation RENDERING1 in the low power driving mode, since the sub-pixel data for the one red sub-pixel R2 is generated based on the third and fourth red sub-pixel data IRD3 and IRD4 for the third and fourth pixels PX3 and PX4, the sub-pixel data for the two green sub-pixels G1 and G2 are generated based on the first and second green sub-pixel data IGD1 and IGD4 for the first and second pixels PX1 and PX2, and the sub-pixel data for the one blue sub-pixel B1 is generated based on the first and second blue sub-pixel data IBD1 and IBD2 for the first and second pixels PX1 and PX2, the first and second red sub-pixel data IRD1 and IRD2, the third and fourth green sub-pixel data IGD3 and IGD4 and the third and fourth blue sub-pixel data IBD3 and IBD4 may not be reflected to the output image data in the low power driving mode, and thus an image quality of a display device may be degraded. In an embodiment of the display device according to the invention, by the second rendering operation RENDERING2, the sub-pixel data RD for the one red sub-pixel R2 may be generated based on the first through fourth red sub-pixel data IRD1, IRD2, IRD3 and IRD4 for the first through fourth pixels PX1 through PX4, the sub-pixel data GD (or GD1 and GD2) for the two green sub-pixels G1 and G2 may be generated based on the first through fourth green sub-pixel data IGD1, IGD2, IGD3 and IGD4 for the first through fourth pixels PX1 through PX4, and the sub-pixel data BD for the one blue sub-pixel B1 may be generated based on the first through fourth blue sub-pixel data IBD1, IBD2, IBD3 and IBD4 for the first through fourth pixels PX1 through PX4. Thus, in such an embodiment, all sub-pixel data IRD1 through IRD4, IGD1 through IGD4 and IBD1 through IBD4 of the input image data IDAT may be reflected to the second output image data ODAT2, and the image quality degradation of the display device may be minimized or reduced.

In an embodiment, for example, as illustrated in FIG. 7, in a case where the input image data IDAT represent a minimum gray level (e.g., a 0-gray level) with respect to odd-numbered pixel rows and represent a maximum gray level (e.g., a 255-gray level) with respect to even-numbered pixel rows, by the conventional rendering operation CONVENTIONAL RENDERING or by the first rendering operation RENDERING1, output image data CODAT for red sub-pixels R, and only the red sub-pixels R may emit light. In an embodiment of the invention, by the second rendering operation RENDERING2, the second output image data ODAT2 for the red, green and blue sub-pixels R, G and B may be generated, and the red, green and blue sub-pixels R, G and B may emit light. Accordingly, in an embodiment of the method of operating the display device according to the invention, the image quality degradation in the low power driving mode may be minimized or reduced.

Figure 8:
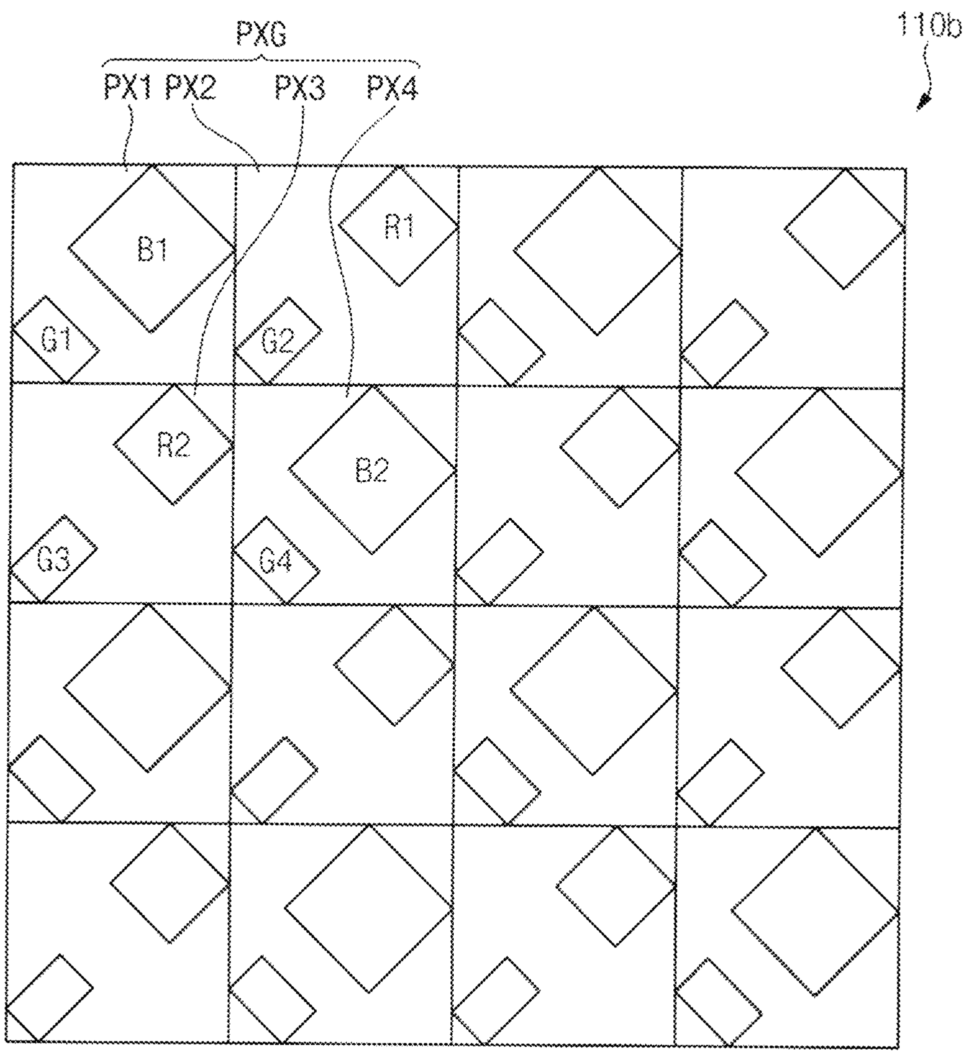
FIG. 8 is a diagram illustrating an embodiment of a display panel driven in a normal driving mode in a display device.
Figure 9:
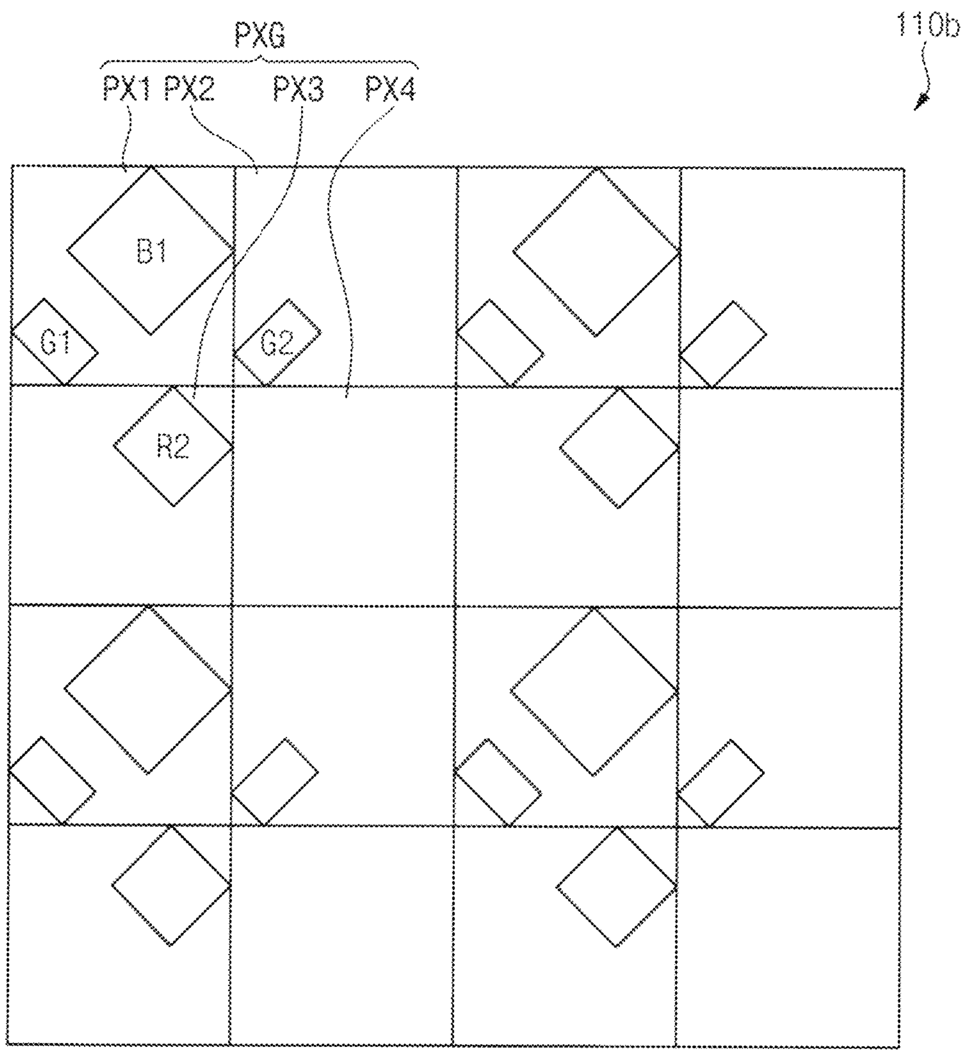
FIG. 9 is a diagram illustrating an embodiment of a display panel driven in a low power driving mode in a display device.

FIG. 8 is a diagram illustrating an embodiment of a display panel driven in a normal driving mode in a display device, and FIG. 9 is a diagram illustrating an embodiment of a display panel driven in a low power driving mode in a display device.

Referring to FIG. 8, in an embodiment, a display panel **110*b* of a display device may include a plurality of pixel groups PXG. Each pixel group PXG may include a first pixel PX1 having a first green sub-pixel G1 and a first blue sub-pixel B1, a second pixel PX2 located adjacent to the first pixel PX1 along a first direction and having a second green sub-pixel G2 and a first red sub-pixel R1, a third pixel PX3 located adjacent to the first pixel PX1 along a second direction and having a third green sub-pixel G3 and a second red sub-pixel R2, and a fourth pixel PX4 located adjacent to the second pixel PX2 along the second direction and adjacent to the third pixel PX3 along the first direction and having a fourth green sub-pixel G4 and a second blue sub-pixel B2. In the display panel 110*b***, one red sub-pixel (e.g., the second red sub-pixel R2), two green sub-pixels (e.g., the first and second green sub-pixels G1 and G2) and one blue sub-pixel (e.g., the first blue sub-pixel B1) adjacent to each other may be located in a diamond shape.

In a normal driving mode, as illustrated in FIG. 8, a display driver of the display device may generate first output image data for all sub-pixels R1, R2, G1, G2, G3, G4, B1 and B2 of the display panel **110*b* by performing a first rending operation on input image data, and may drive the all sub-pixels R1, R2, G1, G2, G3, G4, B1 and B2 of the display panel 110*b*** based on the first output image data.

In a low power driving mode, as illustrated in FIG. 9, the display driver may generate second output image data for a portion of the sub-pixels R1, R2, G1, G2, G3, G4, B1 and B2 of the display panel **110*b***, for example the first green sub-pixel G1, the first blue sub-pixel B1, the second green sub-pixel G2 and the second red sub-pixel R2 by performing a second rending operation different from the first rending operation on the input image data, and may drive the first green sub-pixel G1, the first blue sub-pixel B1, the second green sub-pixel G2 and the second red sub-pixel R2 based on the second output image data. Accordingly, in such an embodiment, power consumption may be reduced in the low power driving mode, and image quality degradation in the low power driving mode may be minimized or reduced.

Figure 10:
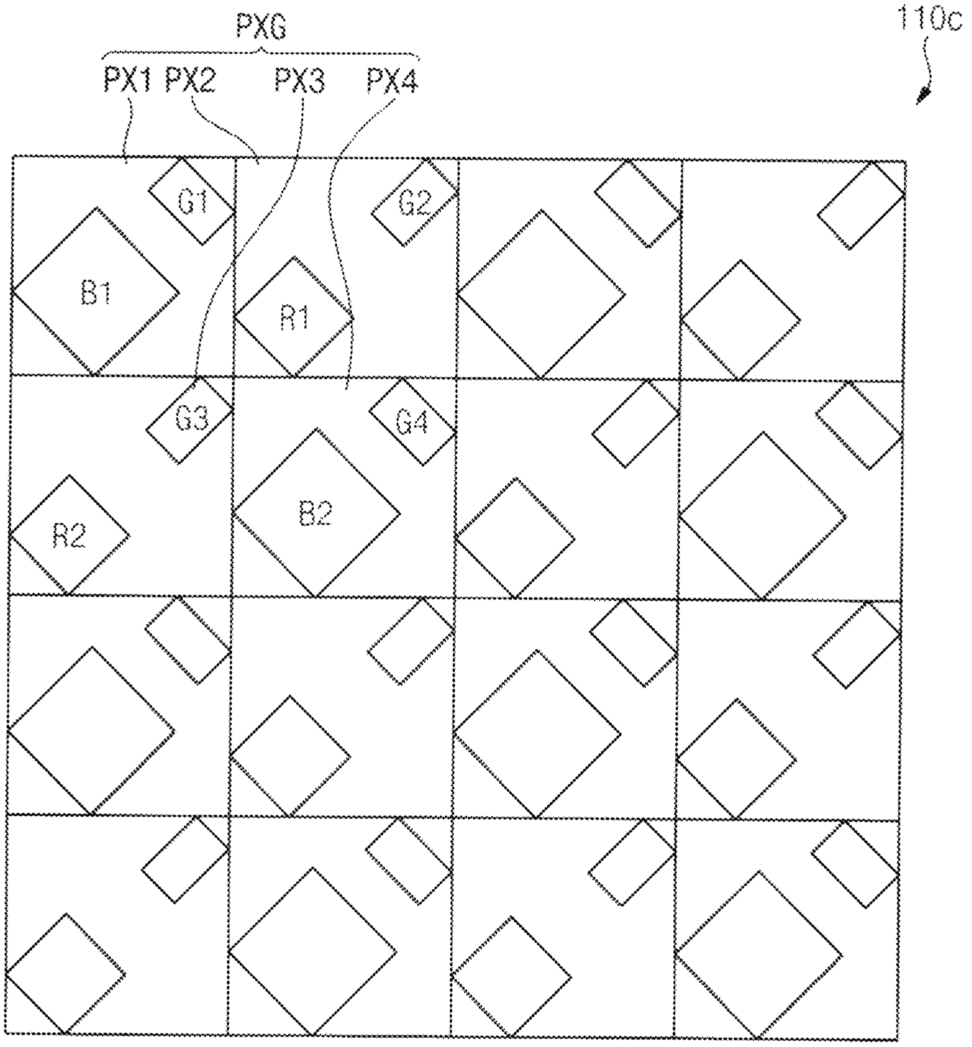
FIG. 10 is a diagram illustrating an embodiment of a display panel driven in a normal driving mode in a display device.
Figure 11:
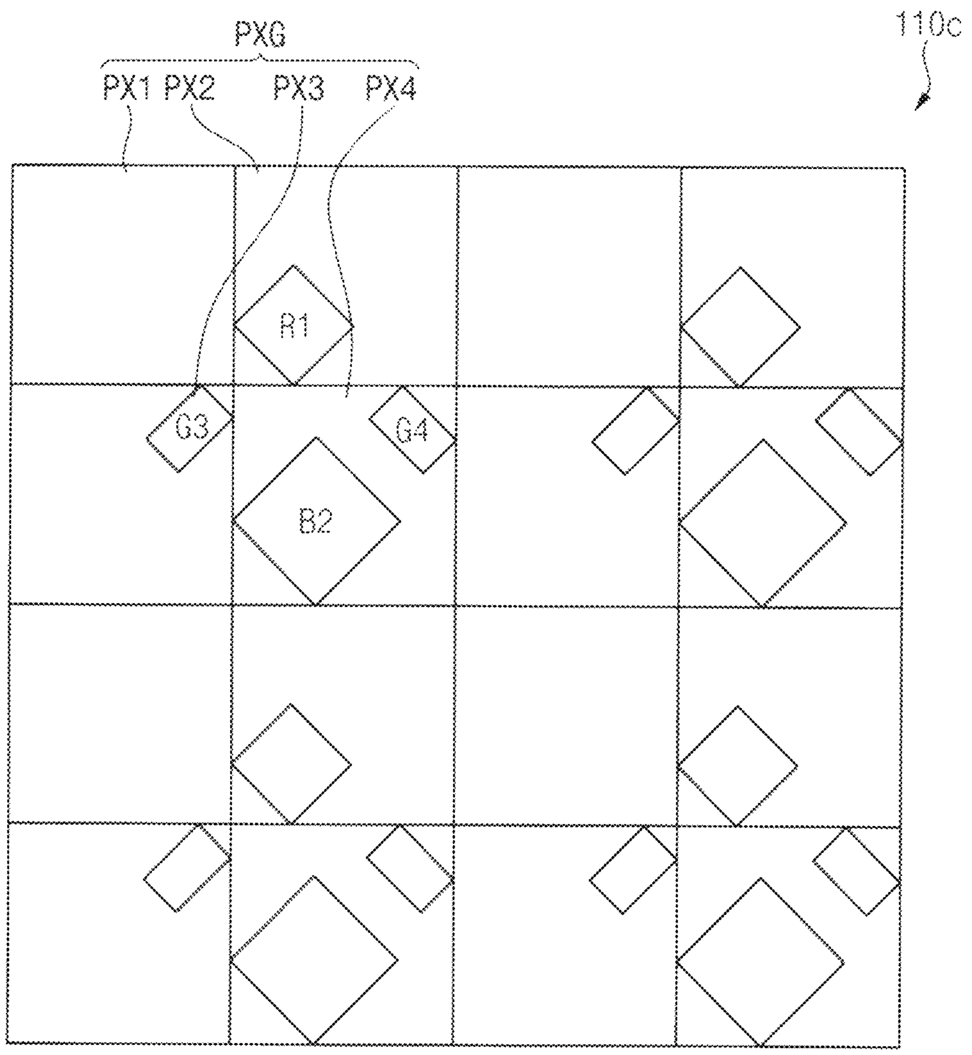
FIG. 11 is a diagram illustrating an embodiment of a display panel driven in a low power driving mode in a display device.

FIG. 10 is a diagram illustrating an embodiment of a display panel driven in a normal driving mode in a display device, and FIG. 11 is a diagram illustrating an embodiment of a display panel driven in a low power driving mode in a display device.

Referring to FIG. 10, in an embodiment, a display panel 110*c* of a display device may include a plurality of pixel groups PXG. Each pixel group PXG may include a first pixel PX1 having a first blue sub-pixel B1 and a first green sub-pixel G1, a second pixel PX2 located adjacent to the first pixel PX1 along a first direction and having a first red sub-pixel R1 and a second green sub-pixel G2, a third pixel PX3 located adjacent to the first pixel PX1 along a second direction and having a second red sub-pixel R2 and a third green sub-pixel G3, and a fourth pixel PX4 located adjacent to the second pixel PX2 along the second direction and adjacent to the third pixel PX3 along the first direction and having a second blue sub-pixel B2 and a fourth green sub-pixel G4. In the display panel 110*c*, one red sub-pixel (e.g., the first red sub-pixel R1), two green sub-pixels (e.g., the third and fourth green sub-pixels G3 and G4) and one blue sub-pixel (e.g., the second blue sub-pixel B2) adjacent to each other may be located in a diamond shape.

In a normal driving mode, as illustrated in FIG. 10, a display driver of the display device may generate first output image data for all sub-pixels R1, R2, G1, G2, G3, G4, B1 and B2 of the display panel 110*c* by performing a first rending operation on input image data, and may drive the all sub-pixels R1, R2, G1, G2, G3, G4, B1 and B2 of the display panel 110*c* based on the first output image data.

In a low power driving mode, as illustrated in FIG. 11, the display driver may generate second output image data for a portion of the sub-pixels R1, R2, G1, G2, G3, G4, B1 and B2 of the display panel 110*c*, for example the first red sub-pixel R1, the third green sub-pixel G3, the second blue sub-pixel B2 and the fourth green sub-pixel G4 by performing a second rending operation different from the first rending operation on the input image data, and may drive the first red sub-pixel R1, the third green sub-pixel G3, the second blue sub-pixel B2 and the fourth green sub-pixel G4 based on the second output image data. Accordingly, in such an embodiment, power consumption may be reduced in the low power driving mode, and image quality degradation in the low power driving mode may be minimized or reduced.

Figure 12:
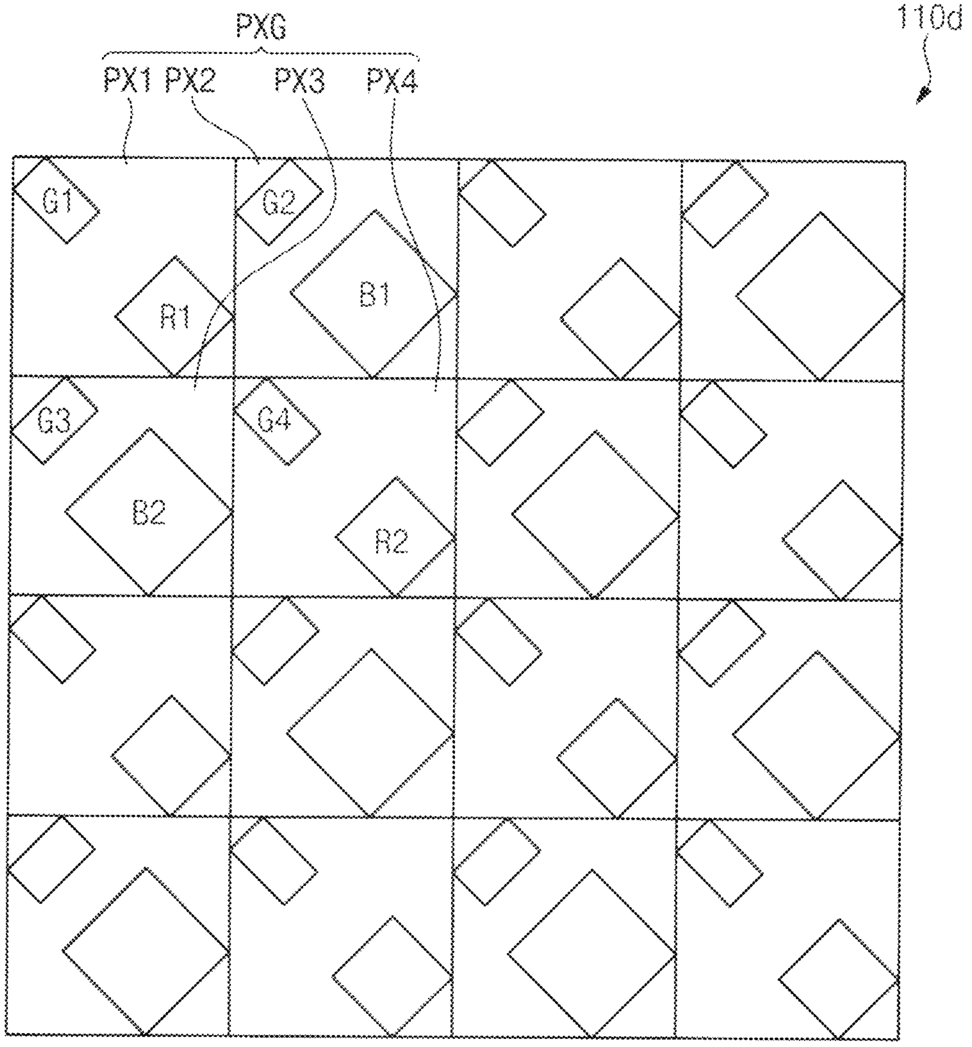
FIG. 12 is a diagram illustrating an embodiment of a display panel driven in a normal driving mode in a display device.
Figure 13:
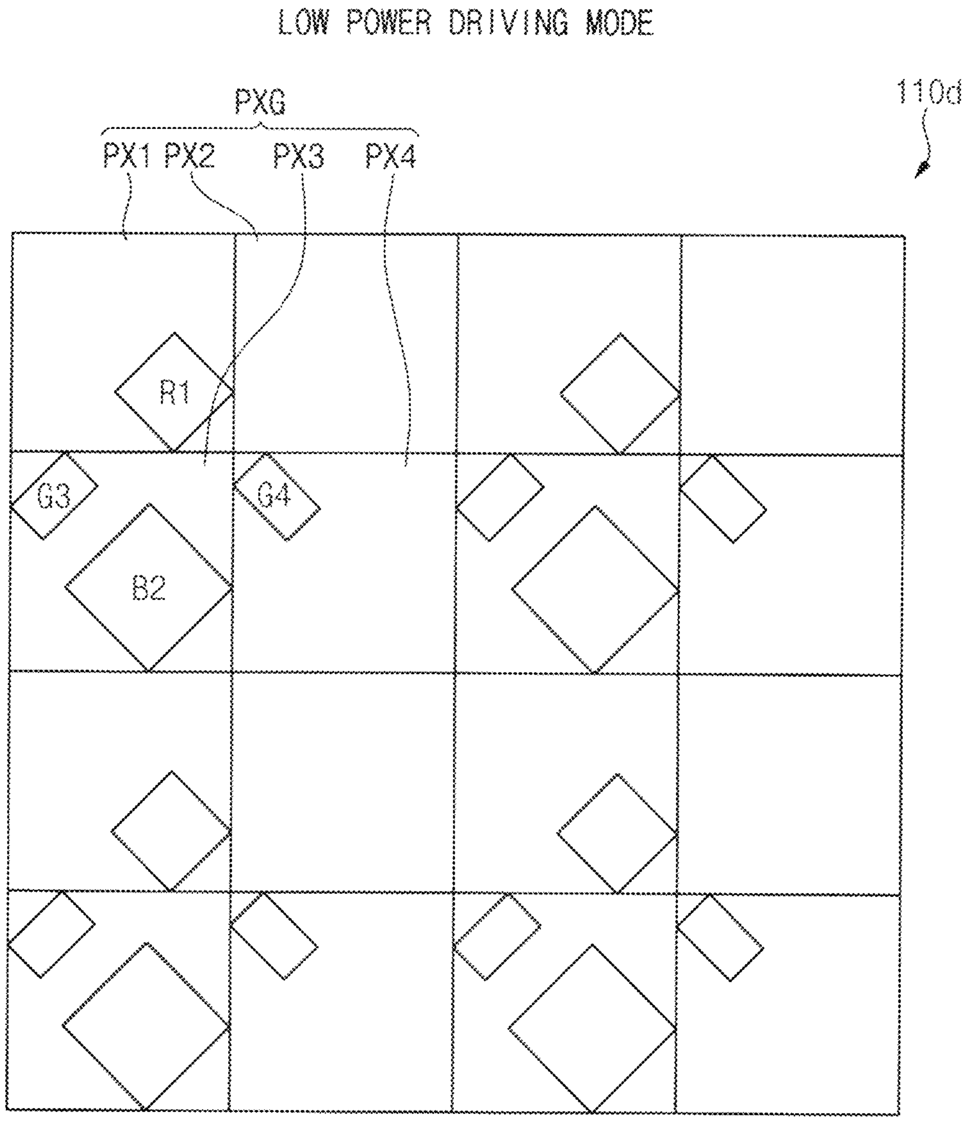
FIG. 13 is a diagram illustrating an embodiment of a display panel driven in a low power driving mode in a display device.

FIG. 12 is a diagram illustrating an embodiment of a display panel driven in a normal driving mode in a display device, and FIG. 13 is a diagram illustrating an embodiment of a display panel driven in a low power driving mode in a display device.

Referring to FIG. 12, in an embodiment, a display panel 110*d* of a display device may include a plurality of pixel groups PXG. Each pixel group PXG may include a first pixel PX1 having a first green sub-pixel G1 and a first red sub-pixel R1, a second pixel PX2 located adjacent to the first pixel PX1 along a first direction and having a second green sub-pixel G2 and a first blue sub-pixel B1, a third pixel PX3 located adjacent to the first pixel PX1 along a second direction and having a third green sub-pixel G3 and a second blue sub-pixel B2, and a fourth pixel PX4 located adjacent to the second pixel PX2 along the second direction and adjacent to the third pixel PX3 along the first direction and having a fourth green sub-pixel G4 and a second red sub-pixel R2. In the display panel 110*d*, one red sub-pixel (e.g., the first red sub-pixel R1), two green sub-pixels (e.g., the third and fourth green sub-pixels G3 and G4) and one blue sub-pixel (e.g., the second blue sub-pixel B2) adjacent to each other may be located in a diamond shape.

In a normal driving mode, as illustrated in FIG. 12, a display driver of the display device may generate first output image data for all sub-pixels R1, R2, G1, G2, G3, G4, B1 and B2 of the display panel 110*d* by performing a first rending operation on input image data, and may drive the all sub-pixels R1, R2, G1, G2, G3, G4, B1 and B2 of the display panel 110*d* based on the first output image data.

In a low power driving mode, as illustrated in FIG. 13, the display driver may generate second output image data for a portion of the sub-pixels R1, R2, G1, G2, G3, G4, B1 and B2 of the display panel 110*d*, for example the first red sub-pixel R1, the third green sub-pixel G3, the second blue sub-pixel B2 and the fourth green sub-pixel G4 by performing a second rending operation different from the first rending operation on the input image data, and may drive the first red sub-pixel R1, the third green sub-pixel G3, the second blue sub-pixel B2 and the fourth green sub-pixel G4 based on the second output image data. Accordingly, in such an embodiment, power consumption may be reduced in the low power driving mode, and image quality degradation in the low power driving mode may be minimized or reduced.

Figure 14:
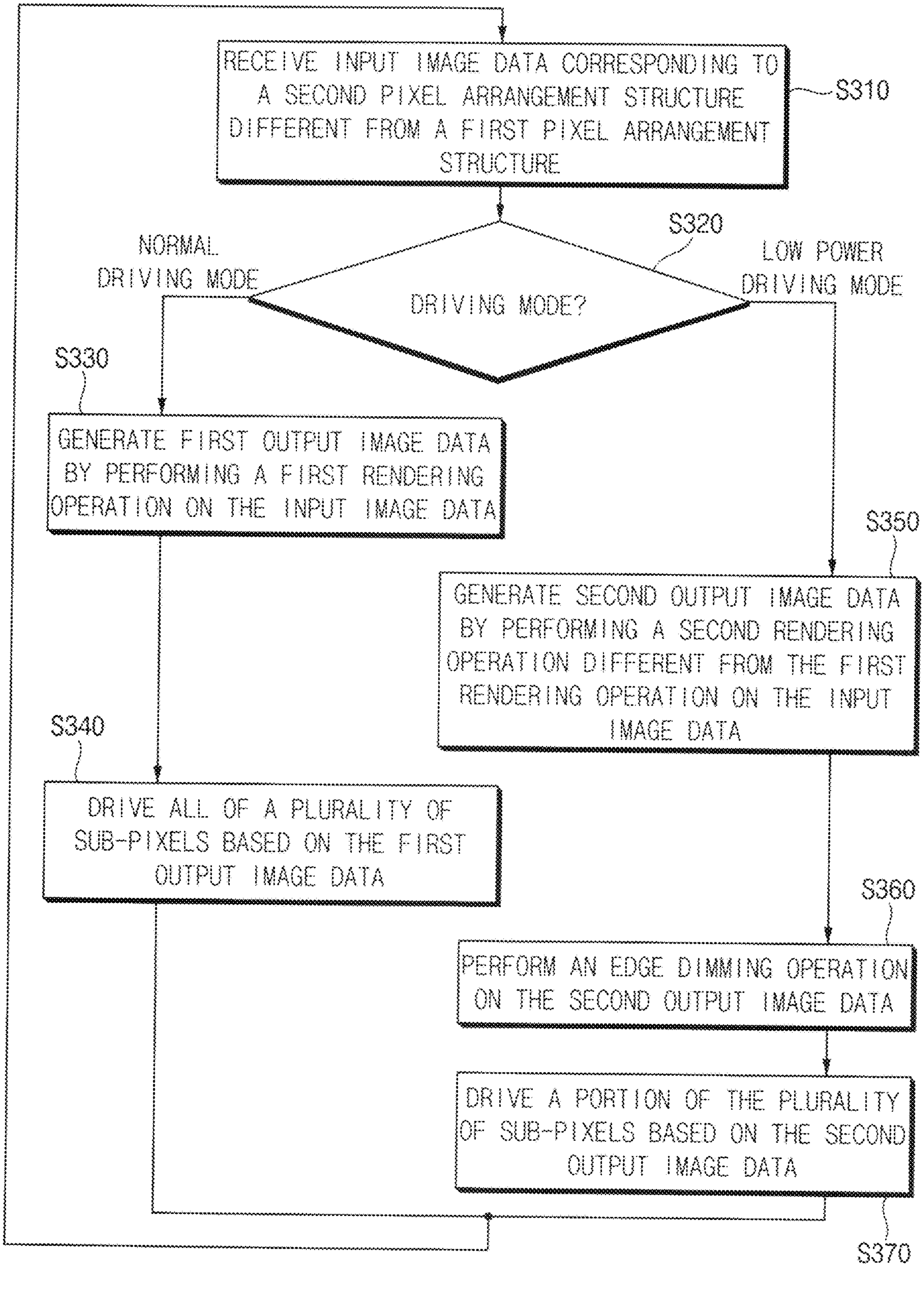
FIG. 14 is a flowchart illustrating a method of operating a display device according to an embodiment.
Figure 15:
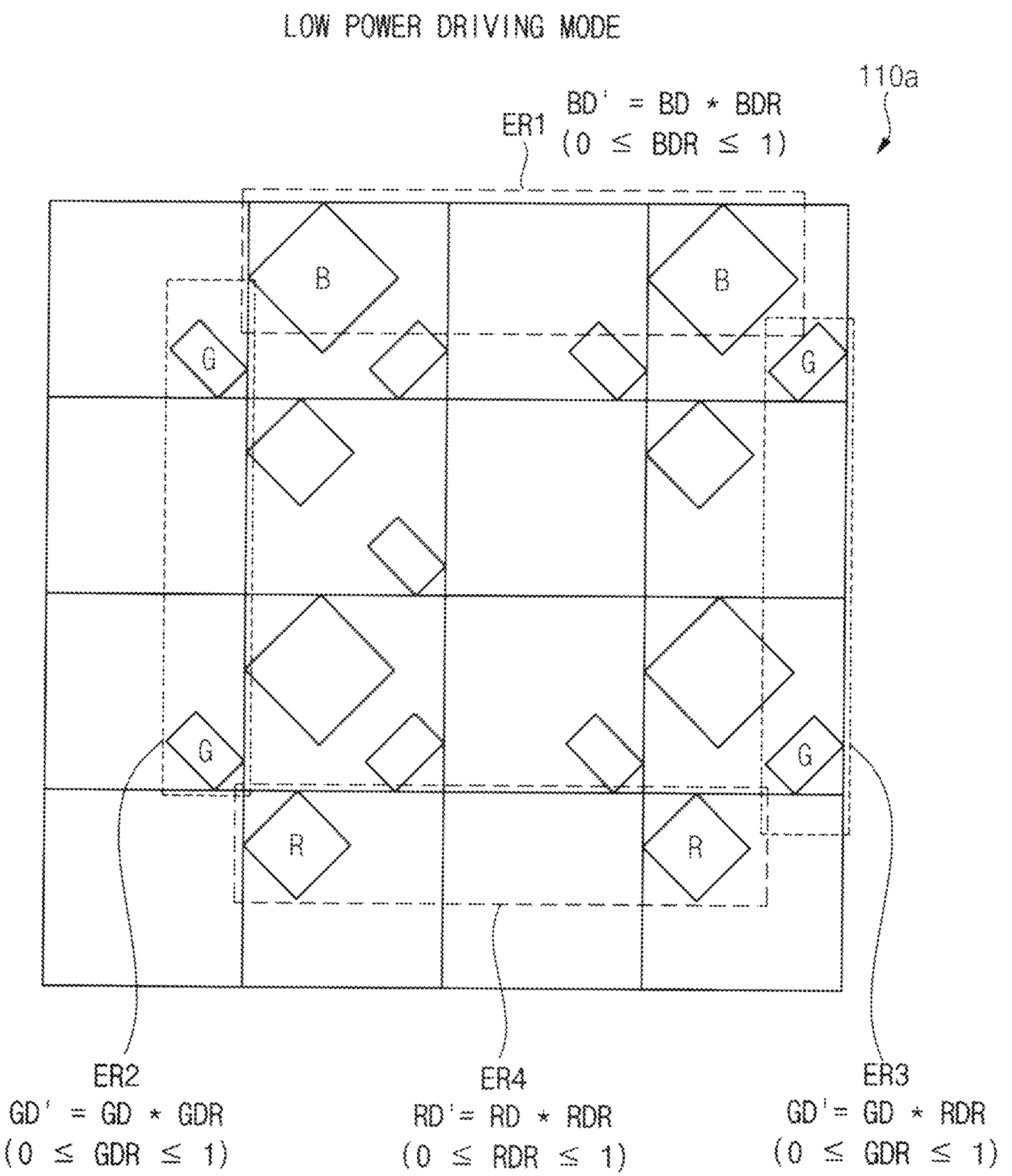
FIG. 15 is a diagram for describing an embodiment of an edge dimming operation performed in a low power driving mode.
Figure 16:
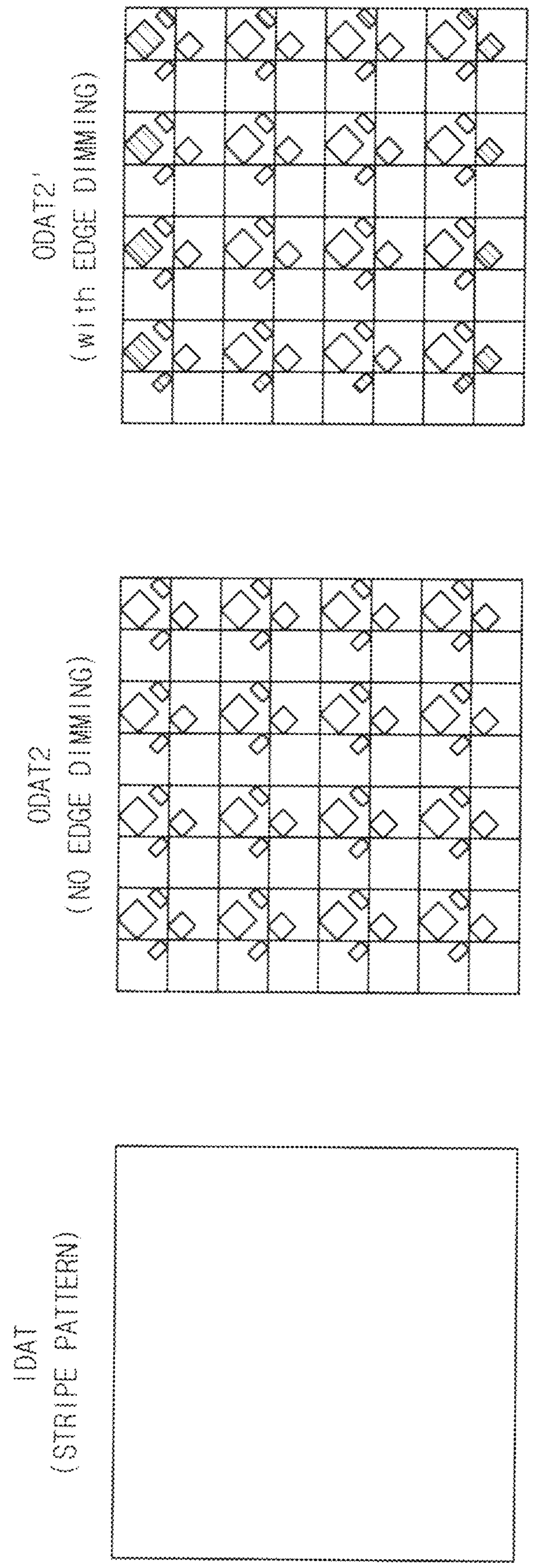
FIG. 16 is a diagram illustrating embodiment of output image data on which an edge dimming operation is not performed and output image data on which an edge dimming operation is performed in a case where input image data having a full white pattern are received.

FIG. 14 is a flowchart illustrating a method of operating a display device according to an embodiment, FIG. 15 is a diagram for describing an embodiment of an edge dimming operation performed in a low power driving mode, and FIG. 16 is a diagram illustrating embodiments of output image data on which an edge dimming operation is not performed and output image data on which an edge dimming operation is performed in a case where input image data having a full white pattern are received.

Referring to FIG. 14, in an embodiment of a method of operating a display device including a plurality of sub-pixels arranged in a first pixel arrangement structure, a display driver of the display device may receive input image data corresponding to a second pixel arrangement structure different from the first pixel arrangement structure (S310).

In a case where a driving mode of the display device is a normal driving mode (S320: NORMAL DRIVING MODE), the display driver may generate first output image data for all of the plurality of sub-pixels by performing a first rending operation on the input image data (S330), and may drive all of the plurality of sub-pixels based on the first output image data (S340).

In a case where the driving mode of the display device is a low power driving mode (S320: LOW POWER DRIVING MODE), the display driver may generate second output image data for a portion of the plurality of sub-pixels by performing a second rending operation different from the first rending operation on the input image data (S350), may perform an edge dimming operation on the second output image data (S360), and may drive the portion of the plurality of sub-pixels based on the second output image data on which the edge dimming operation is performed (S370). In an embodiment, to performs the edge dimming operation, the display driver may multiply sub-pixel data for sub-pixels located in an edge region among the portion of the plurality of sub-pixels by a dimming rate, and the dimming rate is greater than or equal to 0, and is less than or equal to 1.

In an embodiment, for example, as illustrated in FIG. 15, the display driver may multiply sub-pixel data (e.g., blue sub-pixel data BD) for sub-pixels (e.g., blue sub-pixels B) corresponding to a same color located in each (e.g., a first edge region ER1) of four edge regions among the sub-pixels R, G and B of the display panel 110*a* driven in the low power driving mode by a corresponding dimming rate (e.g., a blue dimming rate BDR). In an embodiment, for example, the display driver may generate decreased blue sub-pixel data BD' by multiplying blue sub-pixel data BD for blue sub-pixels B located in a first edge region ER1 by a blue dimming rate BDR greater than or equal to 0 and is less than or equal to 1,may generate decreased green sub-pixel data GD' by multiplying green sub-pixel data GD for green sub-pixels G located in second and third edge regions ER2 and ER3 by a green dimming rate GDR greater than or equal to 0 and is less than or equal to 1, and may generate decreased red sub-pixel data GD' by multiplying red sub-pixel data GD for red sub-pixels R located in a fourth edge region ER4 by a red dimming rate RDR greater than or equal to 0 and is less than or equal to 1.

In an embodiment, for example, as illustrated in FIG. 16, in a case where the input image data IDAT have a full-white pattern and represent a maximum gray level (e.g., a 255-gray level) with respect to all sub-pixels, the second output image data ODAT2 generated by the second rendering operation may represent substantially a same gray level with respect to sub-pixels located in a center region and sub-pixels located in edge regions ER1, ER2, ER3 and ER4. However, since only the sub-pixels corresponding to the same color are located in each edge region ER1, ER2, ER3 and ER4 (for example, only the blue sub-pixels B are located in the first edge region ER1), a color of an image displayed in each edge region ER1, ER2, ER3 and ER4 may be distorted. In an embodiment of the method of operating the display device according to the invention, the edge dimming operation EDGE DIMMING may be performed on the second output image data ODAT2, the second output image data ODAT2' on which the edge dimming operation EDGE DIMMING is performed may represent a reduced gray level with respect to the sub-pixels located in each edge region ER1, ER2, ER3 and ER4, and thus the color distortion in each edge region ER1, ER2, ER3 and ER4 may be minimized or reduced.

Figure 17:
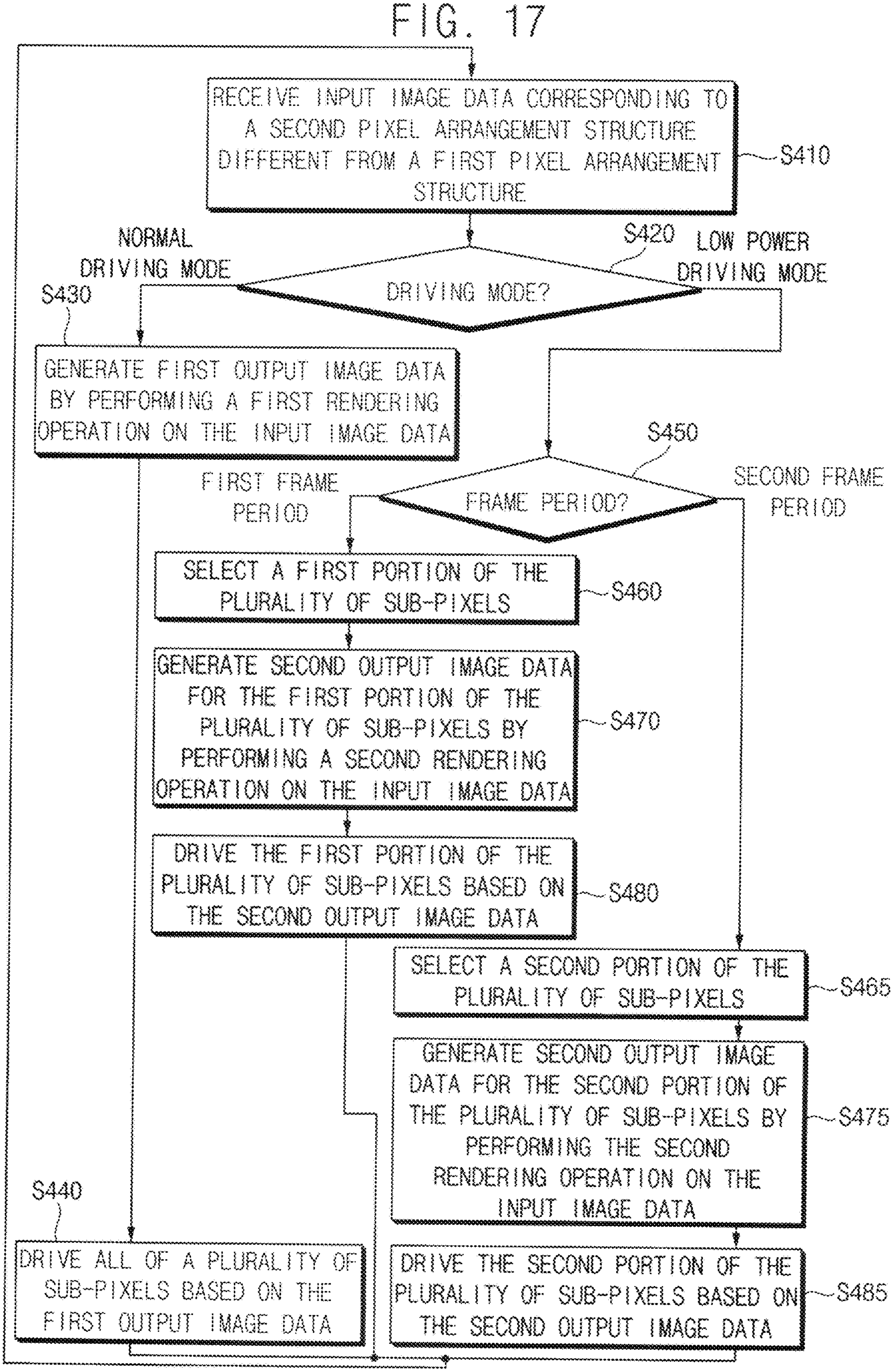
FIG. 17 is a flowchart illustrating a method of operating a display device according to an embodiment.
Figure 18:
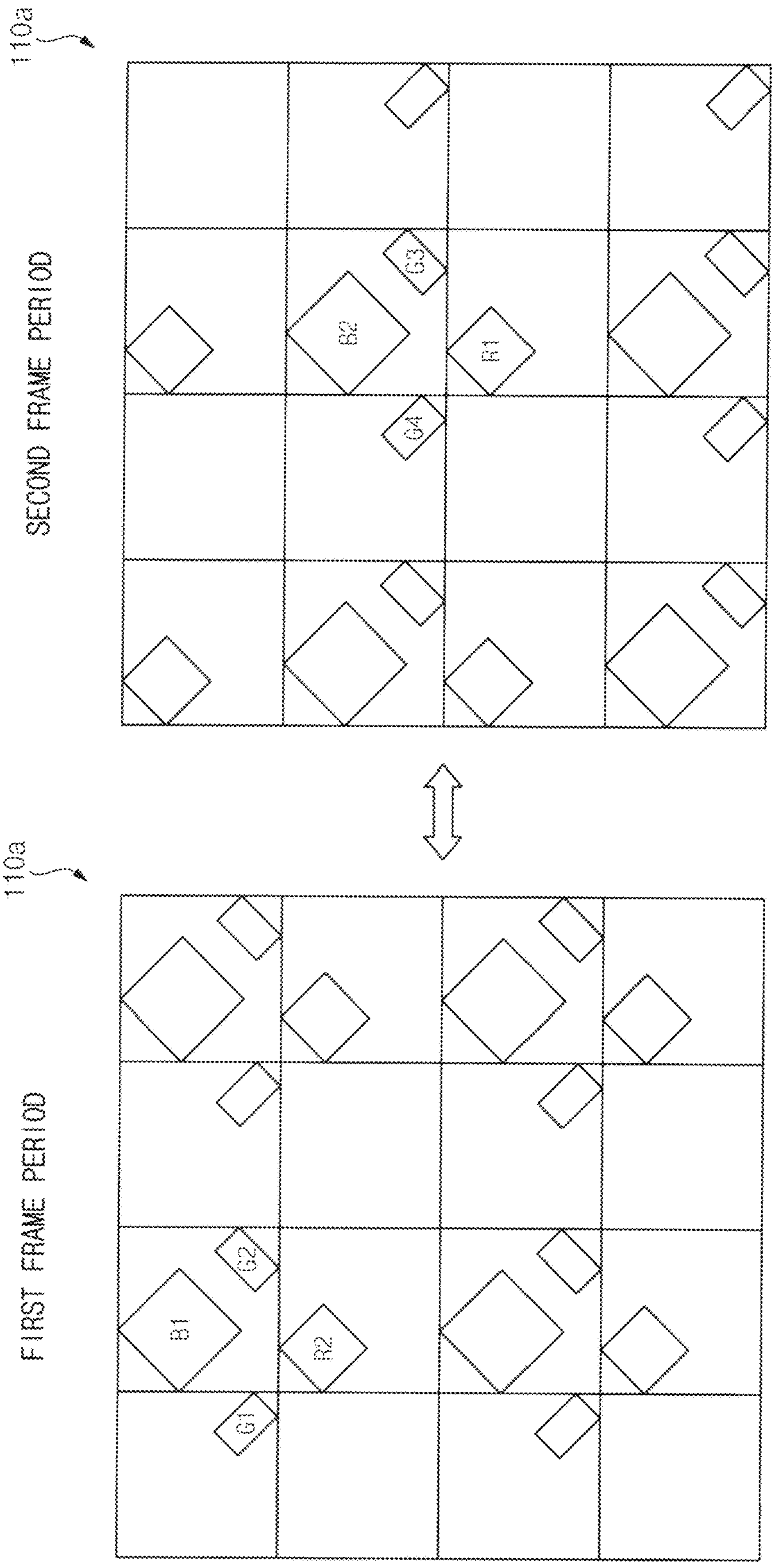
FIG. 18 is a diagram illustrating an embodiment of a display panel where a first portion of a plurality of sub-pixels is driven in a first frame period and a second portion of the plurality of sub-pixels is driven in a second frame period.

FIG. 17 is a flowchart illustrating a method of operating a display device according to an embodiment, and FIG. 18 is a diagram illustrating an embodiment of a display panel where a first portion of a plurality of sub-pixels is driven in a first frame period and a second portion of the plurality of sub-pixels is driven in a second frame period.

Referring to FIG. 17, in an embodiment of a method of operating a display device including a plurality of sub-pixels arranged in a first pixel arrangement structure, a display driver of the display device may receive input image data corresponding to a second pixel arrangement structure different from the first pixel arrangement structure (S410).

In a case where a driving mode of the display device is a normal driving mode (S420: NORMAL DRIVING MODE), the display driver may generate first output image data for all of the plurality of sub-pixels by performing a first rending operation on the input image data (S430), and may drive all of the plurality of sub-pixels based on the first output image data (S440).

In a case where the driving mode of the display device is a low power driving mode (S420: LOW POWER DRIVING MODE), and a current frame period is a first frame period (e.g., an odd-numbered frame period) (S450: FIRST FRAME PERIOD), the display driver may select a first portion of the plurality of sub-pixels (S460), may generate second output image data for the first portion of the plurality of sub-pixels by performing a second rending operation on the input image data (S470), and may drive the first portion of the plurality of sub-pixels based on the second output image data (S480). In a case where the driving mode of the display device is a low power driving mode (S420: LOW POWER DRIVING MODE), and the current frame period is a second frame period (e.g., an even-numbered frame period) (S450: SECOND FRAME PERIOD), the display driver may select a second portion of the plurality of sub-pixels (S465), may generate second output image data for the second portion of the plurality of sub-pixels by performing the second rending operation on the input image data (S475), and may drive the second portion of the plurality of sub-pixels based on the second output image data (S485).

In an embodiment, for example, in the low power driving mode, as illustrated in FIG. 18, the display driver may drive a first green sub-pixel G1, a first blue sub-pixel B1, a second green sub-pixel G2 and a second red sub-pixel R2 of each pixel group of a display panel 110*a* in the first frame period, and may drive a first red sub-pixel R1, a second blue sub-pixel B2, a third green sub-pixel G3 and a fourth green sub-pixel G4 of each pixel group of the display panel 110*a* in the second frame period. The first green sub-pixel G1, the first blue sub-pixel B1, the second green sub-pixel G2 and the second red sub-pixel R2 driven in the first frame period may be arranged in a diamond shape, and the first red sub-pixel R1, the second blue sub-pixel B2, the third green sub-pixel G3 and the fourth green sub-pixel G4 driven in the second frame period also may be arranged in the diamond shape. In such an embodiment, since the sub-pixels R1, B2, G3 and G4 that are not driven in the first frame period are driven in the second frame period, and since the sub-pixels G1, B1, G2 and R2 that are not driven in the second frame period are driven in the first frame period, all sub-pixels R1, G1, B1, G2, B2, G3, R3 and G4 of the display panel 110*a* may be uniformly operated, thereby uniformly degraded. In an embodiment, the first frame period may be the odd-numbered frame, the second frame period may be the even-numbered frame, and the sub-pixels driven in the lower power driving mode may be changed in each frame period. In an alternative embodiment, the sub-pixels driven in the lower power driving mode may be changed in a unit of two or more frame periods. FIG. 18 illustrates an embodiment where the sub-pixels driven in the lower power driving mode are switched between two sets, but not being limited thereto. In an alternative embodiment, the sub-pixels driven in the lower power driving mode may be switched among three or more sets.

Figure 19:
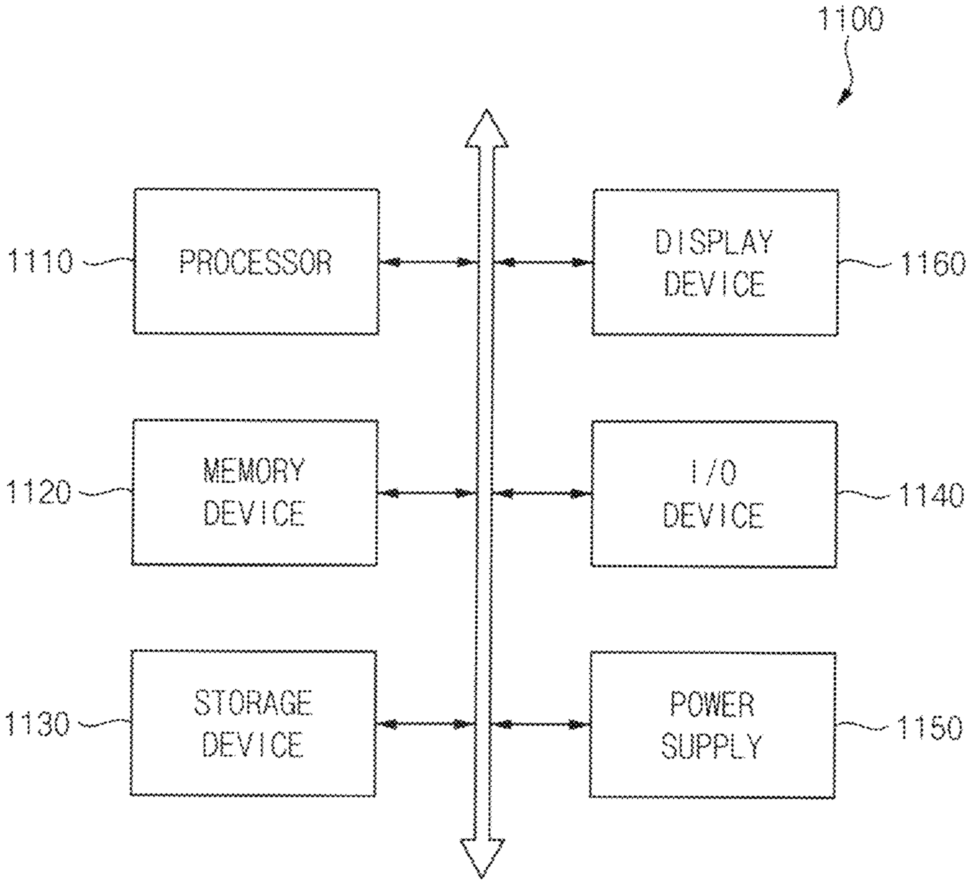
FIG. 19 is a block diagram illustrating an electronic device including a display device according to an embodiment.

FIG. 19 is a block diagram illustrating an electronic device including a display device according to an embodiment.

Referring to FIG. 19, an embodiment of an electronic device 1100 may include a processor 1110, a memory device 1120, a storage device 1130, an input/output ("I/O") device 1140, a power supply 1150, and a display device 1160. In such an embodiment, the electronic device 1100 may further include a plurality of ports for communicating with a video card, a sound card, a memory card, a universal serial bus ("USB") device, other electric devices, etc.

The processor 1110 may perform various computing functions or tasks. The processor 1110 may be an AP, a micro-processor, a central processing unit ("CPU"), etc. The processor 1110 may be coupled to other components via an address bus, a control bus, a data bus, etc. In an embodiment, the processor 1110 may be further coupled to an extended bus such as a peripheral component interconnection ("PCI") bus.

The memory device 1120 may store data for operations of the electronic device 1100. In an embodiment, for example, the memory device 1120 may include at least one non-volatile memory device such as an erasable programmable read-only memory ("EPROM") device, an electrically erasable programmable read-only memory ("EEPROM") device, a flash memory device, a phase change random access memory ("PRAM") device, a resistance random access memory ("RRAM") device, a nano floating gate memory ("NFGM") device, a polymer random access memory ("PoRAM") device, a magnetic random access memory ("MRAM") device, a ferroelectric random access memory ("FRAM") device, etc., and/or at least one volatile memory device such as a dynamic random access memory ("DRAM") device, a static random access memory ("SRAM") device, a mobile DRAM device, etc.

The storage device 1130 may be a solid state drive ("SSD") device, a hard disk drive ("HDD") device, a CD-ROM device, etc. The I/O device 1140 may be an input device such as a keyboard, a keypad, a mouse, a touch screen, etc., and an output device such as a printer, a speaker, etc. The power supply 1150 may supply power for operations of the electronic device 1100. The display device 1160 may be coupled to other components via the buses or other communication links.

In an embodiment, when the display device 1160 is in a normal driving mode, first output image data corresponding to a first pixel arrangement structure of a display panel may be generated by performing a first rendering operation on input image data corresponding to a second pixel arrangement structure, and all of a plurality of sub-pixels of the display panel may be driven based on the first output image data. In such an embodiment, when the display device 1160 is in a low power driving mode, second output image data for a portion of the plurality of sub-pixels may be generated by performing a second rendering operation different from the first rendering operation on the input image data, and the portion of the plurality of sub-pixels may be driven based on the second output image data. Accordingly, in such an embodiment, power consumption of the display device 1160 may be reduced in the low power driving mode, and image quality degradation of the display device may be minimized or reduced.

According to an embodiment, the electronic device 1100 may be any electronic device including the display device 1160, such as a digital television, a three-dimensional ("3D") television, a personal computer ("PC"), a home appliance, a laptop computer, a cellular phone, a smart phone, a tablet computer, a wearable device, a personal digital assistant ("PDA"), a portable multimedia player ("PMP"), a digital camera, a music player, a portable game console, a navigation system, etc.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display device comprising:

a display panel including a plurality of sub-pixels arranged in a first pixel arrangement structure; and a display driver which receives input image data corresponding to a second pixel arrangement structure different from the first pixel arrangement structure, wherein, when the display device is in a normal driving mode, the display driver generates first output image data for all of the plurality of sub-pixels by performing a first rending operation on the input image data, and drives all of the plurality of sub-pixels based on the first output image data, and wherein, when the display device is in a low power driving mode, the display driver generates second output image data for a portion of the plurality of sub-pixels by performing a second rending operation different from the first rending operation on the input image data, and drives the portion of the plurality of sub-pixels based on the second output image data, wherein the display panel includes a plurality of pixel groups, wherein each of the plurality of pixel groups is defined by first and second red sub-pixels, first through fourth green sub-pixels and first and second blue sub-pixels, wherein, with respect to each of the plurality of pixel groups, the input image data include first through fourth red sub-pixel data, first through fourth green sub-pixel data and first through fourth blue sub-pixel data, and wherein one red sub-pixel of the first and second red sub-pixels, two green sub-pixels of the first through fourth green sub-pixels, and one blue sub-pixel of the first and second blue sub-pixels in each of the plurality of pixel groups are driven in the low power driving mode.

2. The display device of claim 1, wherein, to perform the first rendering operation, the display driver calculates sub-pixel data for the first red sub-pixel based on the first and second red sub-pixel data of the input image data, calculates sub-pixel data for the second red sub-pixel based on the third and fourth red sub-pixel data of the input image data, determines the first through fourth green sub-pixel data of the input image data as sub-pixel data for the first through fourth green sub-pixels, calculates sub-pixel data for the first blue sub-pixel based on the first and second blue sub-pixel data of the input image data, and calculates sub-pixel data for the second blue sub-pixel based on the third and fourth blue sub-pixel data of the input image data.

3. The display device of claim 1, wherein the one red sub-pixel, the two green sub-pixels and the one blue sub-pixel driven in the low power driving mode are arranged in a diamond shape.

4. The display device of claim 1, wherein, to perform the second rendering operation, the display driver calculates sub-pixel data for the one red sub-pixel based on the first through fourth red sub-pixel data of the input image data, calculates sub-pixel data for the two green sub-pixels based on the first through fourth green sub-pixel data of the input image data, and calculates sub-pixel data for the one blue sub-pixel based on the first through fourth blue sub-pixel data of the input image data.

5. The display device of claim 1, wherein to perform the second rendering operation, the display driver calculates sub-pixel data for the one red sub-pixel based on the following equation: RD=(IRD1+IRD2+IRD3+

IRD4)/4, wherein RD denotes the sub-pixel data for the one red sub-pixel, and IRD1, IRD2, IRD3 and IRD4 denotes the first, second, third and fourth red sub-pixel data of the input image data, respectively, calculates sub-pixel data for each of the two green sub-pixels based on the following equation: GD=(IGD1+IGD2+IGD3+IGD4)/4, wherein GD denotes the sub-pixel data for each of the two green sub-pixels, and IGD1, IGD2, IGD3 and IGD4 denote the first, second, third and fourth green sub-pixel data of the input image data, respectively, and calculates sub-pixel data for the one blue sub-pixel based on the following equation: BD =(IBD1+IBD2+IBD3+IBD4)/4, wherein BD denotes the sub-pixel data for the one blue sub-pixel, and IBD1, IBD2, IBD3 and IBD4 denote the first, second, third and fourth blue sub-pixel data of the input image data, respectively.

6. The display device of claim 1, wherein, to perform the second rendering operation, the display driver calculate sub-pixel data for the one red sub-pixel based on the following equation: RD=(IRD1+IRD2+IRD3+IRD4)/4, wherein RD denotes the sub-pixel data for the one red sub-pixel, and IRD1, IRD2, IRD3 and IRD4 denote the first, second, third and fourth red sub-pixel data of the input image data, respectively, calculate sub-pixel data for a first one of the two green sub-pixels based on the following equation: GD1=(IGD1+IGD3)/2, wherein GD1 denotes the sub-pixel data for the first one of the two green sub-pixels, and IGD1 and IGD3 denote the first and third green sub-pixel data of the input image data, respectively, calculate sub-pixel data for a second one of the two green sub-pixels based on the following equation: GD2=(IGD2+IGD4)/2, wherein GD2 denotes the sub-pixel data for the second one of the two green sub-pixels, and IGD2 and IGD4 denote the second and fourth green sub-pixel data of the input image data, respectively, and calculate sub-pixel data for the one blue sub-pixel based on the following equation: BD=(IBD1+IBD2+IBD3+IBD4)/4, wherein BD denotes the sub-pixel data for the one blue sub-pixel, and IBD1, IBD2, IBD3 and IBD4 denote the first, second, third and fourth blue sub-pixel data of the input image data, respectively.

7. The display device of claim 1, wherein the display driver performs an edge dimming operation on the second output image data in the low power driving mode.

8. The display device of claim 7, wherein, to perform the edge dimming operation, the display driver multiplies sub-pixel data for sub-pixels located in an edge region among the portion of the plurality of sub-pixels by a dimming rate, and wherein the dimming rate is greater than or equal to 0, and is less than or equal to 1.

9. The display device of claim 1, wherein the first pixel arrangement structure is a diamond pixel arrangement structure, in which adjacent four sub-pixels are arranged in a diamond shape, and the second pixel arrangement structure is a stripe pixel arrangement structure.

10. The display device of claim 1, wherein the display panel includes a plurality of pixel groups, and each of the plurality of pixel groups includes:

a first pixel defined by the first red sub-pixel and the first green sub-pixel;

a second pixel located adjacent to the first pixel along a first direction, and defined by the first blue sub-pixel and the second green sub-pixel;

a third pixel located adjacent to the first pixel along a second direction, and defined by the second blue sub-pixel and the third green sub-pixel; and a fourth pixel located adjacent to the second pixel along the second direction and adjacent to the third pixel along the first direction, and defined by the second red sub-pixel and the fourth green sub-pixel.

11. The display device of claim 10, wherein the first green sub-pixel, the first blue sub-pixel, the second green sub-pixel and the second red sub-pixel in each of the plurality of pixel groups are driven in the low power driving mode.

12. The display device of claim 10, wherein the first green sub-pixel, the second blue sub-pixel, the third green sub-pixel and the second red sub-pixel in each of the plurality of pixel groups are driven in the low power driving mode.

13. The display device of claim 10, wherein the first green sub-pixel, the first blue sub-pixel, the second green sub-pixel and the second red sub-pixel in each of the plurality of pixel groups are driven in a first frame period of the low power driving mode, and wherein the first red sub-pixel, the second blue sub-pixel, the third green sub-pixel and the fourth green sub-pixel in each of the plurality of pixel groups are driven in a second frame period of the low power driving mode.

14. The display device of claim 1, wherein the display panel includes a plurality of pixel groups, and each of the plurality of pixel groups includes:

a first pixel defined by the first green sub-pixel and the first blue sub-pixel;

a second pixel located adjacent to the first pixel along a first direction, and defined by the second green sub-pixel and the first red sub-pixel;

a third pixel located adjacent to the first pixel along a second direction, and defined by the third green sub-pixel and the second red sub-pixel; and a fourth pixel located adjacent to the second pixel along the second direction and adjacent to the third pixel along the first direction, and defined by the fourth green sub-pixel and the second blue sub-pixel, and wherein the first green sub-pixel, the first blue sub-pixel, the second green sub-pixel and the second red sub-pixel in each of the plurality of pixel groups are driven in the low power driving mode.

15. The display device of claim 1, wherein the display panel includes a plurality of pixel groups, and each of the plurality of pixel groups includes:

a first pixel having the first blue sub-pixel and the first green sub-pixel;

a second pixel located adjacent to the first pixel along a first direction, and defined by the first red sub-pixel and the second green sub-pixel;

a third pixel located adjacent to the first pixel along a second direction, and defined by the second red sub-pixel and the third green sub-pixel; and a fourth pixel located adjacent to the second pixel along the second direction and adjacent to the third pixel along the first direction, and defined by the second blue sub-pixel and the fourth green sub-pixel, and wherein the first red sub-pixel, the third green sub-pixel, the second blue sub-pixel and the fourth green sub-pixel in each of the plurality of pixel groups are driven in the low power driving mode.

16. The display device of claim 1, wherein the display panel includes a plurality of pixel groups, and each of the plurality of pixel groups includes:

a first pixel having the first green sub-pixel and the first red sub-pixel;

a second pixel located adjacent to the first pixel along a first direction, and defined by the second green sub-pixel and the first blue sub-pixel;

a third pixel located adjacent to the first pixel along a second direction, and defined by the third green sub-pixel and the second blue sub-pixel; and a fourth pixel located adjacent to the second pixel along the second direction and adjacent to the third pixel along the first direction, and defined by the fourth green sub-pixel and the second red sub-pixel, and wherein the first red sub-pixel, the third green sub-pixel, the second blue sub-pixel and the fourth green sub-pixel in each of the plurality of pixel groups are driven in the low power driving mode.

17. A method of operating a display device including a plurality of sub-pixels arranged in a first pixel arrangement structure, the method comprising:

receiving input image data corresponding to a second pixel arrangement structure different from the first pixel arrangement structure;

generating first output image data for all of the plurality of sub-pixels by performing a first rending operation on the input image data when the display device is in a normal driving mode;

driving all of the plurality of sub-pixels based on the first output image data when the display device is in the normal driving mode;

generating second output image data for a portion of the plurality of sub-pixels by performing a second rending operation different from the first rending operation on the input image data when the display device is in a low power driving mode; and driving the portion of the plurality of sub-pixels based on the second output image data when the display device is in the low power driving mode.

wherein a display panel of the display device includes a plurality of pixel groups, wherein each of the plurality of pixel groups is defined by first and second red sub-pixels, first through fourth green sub-pixels and first and second blue sub-pixels, wherein, with respect to each of the plurality of pixel groups, the input image data include first through fourth red sub-pixel data, first through fourth green sub-pixel data and first through fourth blue sub-pixel data, and wherein one red sub-pixel of the first and second red sub-pixels, two green sub-pixels of the first through fourth green sub-pixels, and one blue sub-pixel of the first and second blue sub-pixels in each of the plurality of pixel groups are driven in the low power driving mode.

18. The method of claim 17, further comprising:

performing an edge dimming operation on the second output image data in the low power driving mode.

* * * * *